US012488974B2

(12) United States Patent
Liu et al.

(10) Patent No.: US 12,488,974 B2
(45) Date of Patent: *Dec. 2, 2025

(54) AEMS AUTO TUNING

(71) Applicant: DH TECHNOLOGIES DEVELOPMENT PTE. LTD., Singapore (SG)

(72) Inventors: Chang Liu, Richmond Hill (CA); Thomas R. Covey, Newmarket (CA)

(73) Assignee: DH Technologies Development Pte. Ltd., Singapore (SG)

( * ) Notice: Subject to any disclaimer, the term of this patent is extended or adjusted under 35 U.S.C. 154(b) by 380 days.

This patent is subject to a terminal disclaimer.

(21) Appl. No.: 17/999,637

(22) PCT Filed: May 21, 2021

(86) PCT No.: PCT/IB2021/054402

§ 371 (c)(1),
(2) Date: Nov. 22, 2022

(87) PCT Pub. No.: WO2021/234645

PCT Pub. Date: Nov. 25, 2021

(65) Prior Publication Data

US 2023/0207298 A1 Jun. 29, 2023

Related U.S. Application Data

(60) Provisional application No. 63/029,247, filed on May 22, 2020.

(51) Int. Cl.
*H01J 49/04* (2006.01)
*H01J 49/16* (2006.01)

(52) U.S. Cl.
CPC ........ *H01J 49/0454* (2013.01); *H01J 49/165* (2013.01)

(58) Field of Classification Search
CPC ............... H01J 49/0454; H01J 49/0009; H01J 49/0027; H01J 49/0404
See application file for complete search history.

(56) References Cited

U.S. PATENT DOCUMENTS 7,923,681 B2 4/2011 Collings et al.
2013/0056631 A1 3/2013 Tomany et al.
(Continued)

OTHER PUBLICATIONS

International Search Report and Written Opinion for PCT/IB2021/054402, mailed Oct. 1, 2021.
(Continued)

*Primary Examiner* — Nicole M Ippolito
(74) *Attorney, Agent, or Firm* — Merchant & Gould P.C.

(57) ABSTRACT

An optimal value is calculated for at least one parameter of an ADE device, an OPI, or an ion source device. For each value of a plurality of parameter values for at least one parameter of the ADE device, the OPI, or the ion source device, three steps are performed using a processor. First, the at least one parameter is set to the value. Second, the ADE device, the OPI, the ion source device, and a mass spectrometer are instructed to produce one or more intensity versus time mass peaks for a sample. Third, a feature value is calculated for at least one feature of the one or more intensity versus time mass peaks. A plurality of feature values corresponding to the plurality of parameter values is produced. An optimal value is calculated for the at least one parameter from the plurality of feature values.

12 Claims, 21 Drawing Sheets

(56) References Cited

U.S. PATENT DOCUMENTS

| | | | | |
|---|---|---|---|---|
| 2019/0157060 | A1 | 5/2019 | Datwani et al. | |
| 2023/0207299 | A1* | 6/2023 | Covey | H01J 49/0036 250/282 |
| 2023/0238232 | A1* | 7/2023 | Cox | H01J 49/0009 250/288 |

OTHER PUBLICATIONS

Hager et al., "Product ion scanning using a Q-q-Q linear ion trap (Q TRAP) mass spectrometer", Rapid Communications in Mass Spectrometry; 2003; 17: 1056-1064).

PCT International Preliminary Report on Patentability in PCT/IB2021/054402, mailed Dec. 1, 2022, 14 pages.

* cited by examiner

200

| PARAMETER \ FEATURE | PEAK HEIGHT | PEAK WIDTH | DELAY TIME BETWEEN EJECTION AND MS | PEAK AREA |
| --- | --- | --- | --- | --- |
| OPI X POSITION | X | X | | |
| OPI Y POSITION | X | X | | |
| OPI INNER TUBE POSITION | X | X | | |
| ESI ELECTRODE PROTRUSION | X | X | | |
| OPI DILUTION FLOWRATE | X | X | X | |
| ADE DROPLET SIZE (VOLUME) | X | | | X |
| ADE DROPLET COUNT (VOLUME) | X | | | X |
| ADE DELAY TIME BETWEEN EJECTIONS | X | | | X |

1500

FIG. 15

AEMS AUTO TUNING

RELATED US APPLICATION

This application is a National Stage Application of PCT/IB2021/054402, filed May 21, 2021, which claims the benefit of U.S. Provisional Application No. 63/029,247, filed May 22, 2020, the entire disclosures of which are incorporated herein by reference in their entireties. To the extent appropriate, a claim of priority is made to each of the above disclosed applications.

INTRODUCTION

The teachings herein relate to operating an acoustic ejection mass spectrometry (AEMS) system to auto-tune parameters of the system. Specifically, the operational parameters of an acoustic droplet ejection (ADE) device, an open port interface (OPI), or an ion source device of the AEMS system are calculated automatically from a series of mass spectrometry (MS) experiments. In these experiments, the value of one or more operational parameters of the ADE device, the OPI, or the ion source device is varied. One or more mass peaks are detected for each value of the one or more operational parameters. An optimal value for one or more operational parameters is calculated from this data.

ADE and OPI Tuning Problem

High-throughput sample analysis is critical to the drug discovery process. Mass spectrometry (MS) based methods can achieve label-free, universal mass detection of a wide range of analytes with exceptional sensitivity, selectivity, and specificity. As a result, there is significant interest in improving the throughput of MS-based analysis for drug discovery. In particular, a number of sample introduction systems for MS-based analysis have been improved to provide higher throughput.

As described below, recently ADE has been combined with an OPI to provide a sample introduction system for high-throughput mass spectrometry. When an ADE device and OPI are coupled to a mass spectrometer, the system can be referred to as an AEMS system.

The analytical performance (sensitivity, reproducibility, throughput, etc.) of an AEMS system depends on the performance of the ADE device and OPI. The performance of the ADE device and OPI depends on selecting the optimal operational conditions or parameters for these devices.

There are two types of operational parameters that need to be set for the ADE device and OPI. The first type of parameters are parameters that are set for the devices for all experiments or assays. These parameters include, but are not limited to, the alignment of the OPI with the ADE, the position of the inner tube of the OPI relative to the outer tube of the OPI, the amount of the protrusion of the OPI electrode from the electrospray ion source (ESI) nozzle, and the flow rate of the sample-solvent dilution in the OPI.

The second type of parameters are parameters that are set for a particular experiment or a particular analyte and solution or matrix. These parameters include, but are not limited to, the ejection volume of the sample produced by the ADE device and the delay time from the ejection of a sample by the ADE device to the detection of a peak for the sample by the mass spectrometer.

Unfortunately, currently, both types of parameters are set manually by a user of an AEMS system and may not be properly optimized. As a result, additional systems and methods are needed to optimally set the operational parameters of an ADE device or OPI of an AEMS system before an experiment.

ADE and OPI Background

Accurate determination of the presence, identity, concentration, and/or quantity of an analyte in a sample is critically important in many fields. Many techniques used in such analyses involve ionization of species in a fluid sample prior to introduction into the analytical equipment employed. The choice of ionization method will depend on the nature of the sample and the analytical technique used, and many ionization methods are available such as electrospray ionization (ESI), matrix assisted laser desorption Ionization (MALDI), desorption electrospray ionization (DESI), etc. ESI is typically preferred. Mass spectrometry is a well-established analytical technique in which sample molecules are ionized and the resulting ions are then sorted by mass-to-charge ratio.

The ability to couple mass spectrometric analysis, particularly electrospray mass spectrometric analysis, to separation techniques, such as liquid chromatography (LC), including high-performance liquid chromatography (HPLC), capillary electrophoresis, or capillary electrochromatography, has meant that complex mixtures can be separated and characterized in a single process. Improvements in HPLC system design, such as reductions in dead volumes and an increase in pumping pressure, have enabled the benefits of smaller columns containing smaller particles, improved separation, and faster run time to be realized. Despite these improvements, the time required for sample separation is still around one minute. Even if real separation is not required, the mechanics of loading samples into the mass spectrometer still limit sample loading time to about ten seconds per sample using conventional autosamplers with some level of cleanup between injections.

There has been some success in improving throughput performance. Simplifying sample processing by using solid-phase extraction, rather than traditional chromatography, to remove salts can reduce pre-injection times to under ten seconds per sample from the minutes per sample required for HPLC. However, the increase in sampling speed comes at the cost of selectivity or sensitivity. Furthermore, the time saved by the increase in sampling speed is offset by the need for cleanup between samples.

Another limitation of current mass spectrometer loading processes is the problem of carryover between samples, which necessitates a cleaning step after each sample is loaded to avoid contamination of a subsequent sample with a residual amount of analyte in the prior sample. This requires time and adds a step to the process, complicating rather than streamlining the analysis with conventional autosampler systems.

Additional limitations of current mass spectrometers when used to process complex samples, such as biological fluids, are unwanted ""matrix effects,"" phenomena that result from the presence of matrix components (e.g., natural matrix components such as cellular matrix components, or contaminants inherent in some materials, such as plastics) and adversely affect detection capability, precision, and/or accuracy for the analyte of interest.

A system was developed combining ADE with an open port interface (OPI) for high-throughput mass spectrometry. This system is described in U.S. patent application Ser. No. 16/198,667 (hereinafter the "'667 Application"), which is incorporated herein in its entirety.

FIG. 1A is an exemplary system combining ADE with an OPI, as described in the '667 Application. In FIG. 1A, the ADE device is shown generally at 11, ejecting droplet 49 toward the continuous flow OPI indicated generally at 51 and into the sampling tip 53 thereof.

ADE device 11 includes at least one reservoir, with a first reservoir shown at 13 and an optional second reservoir 31. In some embodiments, a further plurality of reservoirs may be provided. Each reservoir is configured to house a fluid sample having a fluid surface, e.g., a first fluid sample 14 and a second fluid sample 16 having fluid surfaces respectively indicated at 17 and 19. The fluid samples 14 and 16 may be the same or different, but are generally different, insofar as they will ordinarily contain two different analytes intended to be transported to and detected in an analytical instrument (not shown). The analyte may be a biomolecule or a macromolecule other than a biomolecule, or it may be a small organic molecule, an inorganic compound, an ionized atom, or any moiety of any size, shape, or molecular structure, as explained earlier in this section. In addition, the analyte may be dissolved, suspended or dispersed in the liquid component of the fluid sample.

When more than one reservoir is used, as illustrated in FIG. 1A, the reservoirs are preferably both substantially identical and substantially acoustically indistinguishable, although identical construction is not a requirement. As explained earlier in this section, the reservoirs may be separate, removable components in a tray, rack, or other such structure, but they may also be fixed within a plate, e.g., a well plate, or another substrate. Each reservoir is preferably substantially axially symmetric, as shown, having vertical walls 21 and 23 extending upward from circular reservoir bases 25 and 27, and terminating at openings 29 and 31, respectively, although other reservoir shapes and reservoir base shapes may be used. For example, some the wells may be tapered such that the well has a larger cross sectional area at the top of the well vs. the bottom of the well. The material and thickness of each reservoir base should be such that acoustic radiation may be transmitted therethrough and into the fluid sample contained within each reservoir.

ADE device 11 comprises acoustic ejector 33, which includes acoustic radiation generator 35 and focusing means 37 for focusing the acoustic radiation generated at a focal point 47 within the fluid sample, near the fluid surface. As shown in FIG. 1A, the focusing means 37 may comprise a single solid piece having a concave surface 39 for focusing the acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the device.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and the underside of the reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave generated by the acoustic radiation generator is directed by the focusing means 37 into the acoustic coupling medium 41, which then transmits the acoustic radiation into the reservoir 13. The system may contain a single acoustic ejector, as illustrated in FIG. 1A, or, as noted previously, it may contain multiple ejectors.

In operation, reservoir 13 and optional reservoir 15 of the device are filled with first and second fluid samples 14 and 16, respectively, as shown in FIG. 1A. The acoustic ejector 33 is positioned just below reservoir 13, with acoustic coupling between the ejector and the reservoir provided by means of acoustic coupling medium 41. Initially, the acoustic ejector is positioned directly below sampling tip 53 of OPI 51, such that the sampling tip faces the surface 17 of the fluid sample 14 in the reservoir 13. Once the ejector 33 and reservoir 13 are in proper alignment below sampling tip 53, the acoustic radiation generator 35 is activated to produce acoustic radiation that is directed by the focusing means 37 to a focal point 47 near the fluid surface 17 of the first reservoir. As a result, droplet 49 is ejected from the fluid surface 17 toward and into the liquid boundary 50 at the sampling tip 53 of the OPI 51, where it combines with solvent in the flow probe 53.

The profile of the liquid boundary 50 at the sampling tip 53 may vary from extending beyond the sampling tip 53 to projecting inward into the OPI 51. In a multiple-reservoir system, the reservoir unit (not shown), e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating "carryover" between droplet ejection events. A multi-well plate can include, but is not limited to, a 24 well, a 384 well, or a 1536 well plate.

Fluid samples 14 and 16 are samples of any fluid for which transfer to an analytical instrument is desired. Accordingly, the fluid sample may contain a solid that is minimally, partially or fully solvated, dispersed, or suspended in a liquid, which may be an aqueous liquid or a nonaqueous liquid. The structure of OPI 51 is also shown in FIG. 1A. Any number of commercially available continuous flow OPIs can be used as is or in modified form, all of which, as is well known in the art, operate according to substantially the same principles. As can be seen in FIG. 1A, the sampling tip 53 of OPI 51 is spaced apart from the fluid surface 17 in the reservoir 13, with a gap 55 therebetween. The gap 55 may be an air gap, or a gap of an inert gas, or it may comprise some other gaseous material; there is no liquid bridge connecting the sampling tip 53 to the fluid 14 in the reservoir 13.

The OPI 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing fluid sample 14 combines with the solvent to form an analyte-solvent dilution. A solvent pump (not shown) is operably connected to and in fluid communication with solvent inlet 57 in order to control the rate of solvent flow into the solvent transport capillary and thus the rate of solvent flow within the solvent transport capillary 59 as well.

Fluid flow within the probe 53 carries the analyte-solvent dilution through a sample transport capillary 61 provided by inner capillary tube 73 toward sample outlet 63 for subsequent transfer to an analytical instrument. A sampling pump (not shown) can be provided that is operably connected to and in fluid communication with the sample transport capillary 61, to control the output rate from outlet 63.

In one embodiment, a positive displacement pump is used as the solvent pump, e.g., a peristaltic pump, and, instead of a sampling pump, an aspirating nebulization system is used so that the analyte-solvent dilution is drawn out of the sample outlet 63 by the Venturi effect caused by the flow of the nebulizing gas introduced from a nebulizing gas source 65 via gas inlet 67 (shown in simplified form in FIG. 1A, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator is used to control the rate of gas flow into the system via gas inlet 67.

In a preferred manner, the nebulizing gas flows over the outside of the sample transport capillary 61 at or near the sample outlet 63 in a sheath flow type manner that draws the analyte-solvent dilution through the sample transport capillary 61 as it flows across the sample outlet 63 that causes aspiration at the sample outlet upon mixing with the nebulizer gas. In various embodiments, sample outlet 63 is a straight pipe protruding out of a gas nozzle.

The solvent transport capillary 59 and sample transport capillary 61 are provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the solvent transport capillary 59. The dimensions of the inner capillary tube 73 can be from 1 micron to 1 mm, e.g., 200 microns. Typical dimensions of the outer diameter of the inner capillary tube 73 can be from 100 microns to 3 or 4 centimeters, e.g., 360 microns. Typical dimensions of the inner diameter of the outer capillary tube 71 can be from 100 microns to 3 or 4 centimeters, e.g., 450 microns. Typical dimensions of an outer diameter of the outer capillary tube 71 can be from 150 microns to 3 or 4 centimeters, e.g., 950 microns. The cross-sectional areas of the inner capillary tube 73 and/or the outer capillary tube 71 can be circular, elliptical, superelliptical (i.e., shaped like a superellipse), or even polygonal. While the illustrated system in FIG. 1A indicates the direction of solvent flow as downward from the solvent inlet 57 toward sampling tip 53 in the solvent transport capillary 59 and the direction of the analyte-solvent dilution flow as upward from the sampling tip 53 upward through the sample transport capillary 61 toward outlet 63, the directions can be reversed, and the OPI 51 is not necessarily positioned to be exactly vertical. Various modifications to the structure shown in FIG. 1A will be apparent to those of ordinary skill in the art, or may be deduced by those of ordinary skill in the art during use of the system.

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the OPI 51, and the inner and outer capillary tubes 73, 71 can be arranged coaxially around a longitudinal axis of the OPI 51, as shown in FIG. 1.

Optionally, prior to use, the adjuster 75 is used to draw the inner capillary tube 73 longitudinally inward so that the outer capillary tube 71 protrudes beyond the end of the inner capillary tube 73, so as to facilitate optimal fluid communication between the solvent flow in the solvent transport capillary 59 and the sample transported as an analyte-solvent dilution flow 61 in the sample transport capillary 61. Additionally, as illustrated in FIG. 1A, the OPI 51 is generally affixed within an approximately cylindrical holder 81, for stability and ease of handling.

FIG. 1B is an exemplary system 110 for ionizing and mass analyzing analytes received within an open end of a sampling OPI, as described in the '667 Application. System 110 includes acoustic droplet injection device 11 configured to inject a droplet 49 from a reservoir into the open end of sampling OPI 51. As shown in FIG. 1B, the exemplary system 110 generally includes a sampling OPI 51 in fluid communication with a nebulizer-assisted ion source 160 for discharging a liquid containing one or more sample analytes (e.g., via electrospray electrode 164) into an ionization chamber 112, and a mass analyzer 170 in fluid communication with the ionization chamber 112 for downstream processing and/or detection of ions generated by the ion source 160. A fluid handling system 140 (e.g., including one or more pumps 143 and one or more conduits) provides for the flow of liquid from a solvent reservoir 150 to the sampling OPI 51 and from the sampling OPI 51 to the ion source 160. For example, as shown in FIG. 1B, the solvent reservoir 150 (e.g., containing a liquid, desorption solvent) can be fluidly coupled to the sampling OPI 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 51 occurs within a sample space accessible at the open end such that one or more droplets 49 can be introduced into the liquid boundary 50 at the sample tip and subsequently delivered to the ion source 160.

As shown, the system 110 includes an acoustic droplet injection device 11 that is configured to generate acoustic energy that is applied to a liquid contained within a reservoir (as depicted in FIG. 1A) that causes one or more droplets 49 to be ejected from the reservoir into the open end of the sampling OPI 51. A controller 180 can be operatively coupled to the acoustic droplet injection device 11 and can be configured to operate any aspect of the acoustic droplet injection device 11 (e.g., focusing means, acoustic radiation generator, automation means for positioning one or more reservoirs into alignment with the acoustic radiation generator, etc.) so as to inject droplets into the sampling OPI 51 or otherwise discussed herein substantially continuously or for selected portions of an experimental protocol by way of non-limiting example. Controller 180 can be, but is not limited to, a microcontroller, a computer, a microprocessor, the computer system of FIG. 1, or any device capable of sending and receiving control signals and data.

As shown in FIG. 1B, the exemplary ion source 160 can include a source 65 of pressurized gas (e.g. nitrogen, air, or a noble gas) that supplies a high velocity nebulizing gas flow that surrounds the outlet end of the electrospray electrode 164 and interacts with the fluid discharged therefrom to enhance the formation of the sample plume and the ion release within the plume for sampling by 114*b* and 116*b*, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 180 (e.g., via opening and/or closing valve 163).

It will be appreciated that the flow rate of the nebulizer gas can be adjusted (e.g., under the influence of controller 180) such that the flow rate of liquid within the sampling OPI 51 can be adjusted based, for example, on suction/aspiration force generated by the interaction of the nebulizer gas and the analyte-solvent dilution as it is being discharged from the electrospray electrode 164 (e.g., due to the Venturi effect).

As shown in FIG. 1B, the ionization chamber 112 can be maintained at atmospheric pressure, though in some embodiments, the ionization chamber 112 can be evacuated to a pressure lower than atmospheric pressure. The ionization chamber 112, within which the analyte can be ionized as the analyte-solvent dilution is discharged from the electrospray electrode 164, is separated from a gas curtain chamber 114 by a plate 114*a* having a curtain plate aperture 114*b*. As shown, a vacuum chamber 116, which houses the mass analyzer 170, is separated from the curtain chamber 114 by a plate 116*a* having a vacuum chamber sampling orifice 116*b*. The curtain chamber 114 and vacuum chamber 116 can be maintained at a selected pressure(s) (e.g., the same or different sub-atmospheric pressures, a pressure lower than the ionization chamber) by evacuation through one or more vacuum pump ports 118.

It will also be appreciated by a person skilled in the art and in light of the teachings herein that the mass analyzer 170 can have a variety of configurations. Generally, the mass analyzer 170 is configured to process (e.g., filter, sort, dissociate, detect, etc.) sample ions generated by the ion source 160. By way of non-limiting example, the mass analyzer 170 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17:1056-1064), and U.S. Pat. No. 7,923,681, entitled "Collision Cell for Mass Spectrometer," which are hereby incorporated by reference in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 110 including, for example, an ion mobility spectrometer (e.g., a differential mobility spectrometer) that is disposed between the ionization chamber 112 and the mass analyzer 170 and is configured to separate ions based on their mobility through a drift gas in high- and low-fields rather than their mass-to-charge ratio). Additionally, it will be appreciated that the mass analyzer 170 can comprise a detector that can detect the ions that pass through the analyzer 170 and can, for example, supply a signal indicative of the number of ions per second that are detected.

Mass Spectrometry Background

Mass spectrometers are often coupled with chromatography or other sample introduction systems, such as an ADE device and OPI, in order to identify and characterize compounds of interest from a sample or to analyze multiple samples. In such a coupled system, the eluting or injected solvent is ionized and a series of mass spectra are obtained from the eluting solvent at specified time intervals called retention times. These retention times range from, for example, 1 second to 100 minutes or greater. The series of mass spectra form a trace, chromatogram, or extracted ion chromatogram (XIC).

Peaks found in the XIC are used to identify or characterize a known peptide or compound in a sample, for example. More particularly, the retention times of peaks and/or the area of peaks are used to identify or characterize (quantify) a known peptide or compound in the sample. In the case of multiple samples provided over time by a sample introduction device, the retention times of peaks are used to align the peaks with the correct sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In a targeted acquisition method, a list of transitions is typically interrogated during each cycle time. In order to decrease the number transitions that are interrogated at any one time, some targeted acquisition methods have been modified to include a retention time or a retention time range for each transition. Only at that retention time or within that retention time range will that particular transition be interrogated. One targeted acquisition method that allows retention times to be specified with transitions is referred to as scheduled MRM.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS' method, all the precursor ions in each precursor ion mass selection window are fragmented, and all of the product ions of all of the precursor ions in each mass selection window are mass analyzed.

SUMMARY

A system, method, and computer program product are disclosed for automatically calculating an optimal value for at least one operational parameter of an ADE device, an OPI, or an ion source device using a mass spectrometer. The system includes an ADE device, an OPI, an ion source device, a mass spectrometer, and a processor.

The ADE device is adapted to perform one or more ejections of a sample over time. The OPI is adapted to receive the one or more ejections over time at an inlet of an inner tube, mix received ejections with a solvent to form a series of sample-solvent dilutions, and transfer the series of dilutions to an outlet of the inner tube. The ion source device is adapted to receive the series of dilutions and ionize the series of dilutions, producing an ion beam. The mass spectrometer is adapted to receive the ion beam and mass analyze the ion beam over time, producing intensity versus time mass peaks corresponding to the one or more ejections.

A processor is in communication with the ADE device, the OPI, the ion source device, and the mass spectrometer. For each value of a plurality of parameter values for at least one parameter of the ADE device, the OPI, or the ion source device, the processor performs three steps. Included in these are parameters are such things as pump flowrate and flowrates such as nebulizer gas flowrates. First, the processor sets the at least one parameter to each value. Second, the processor instructs the ADE device, the OPI, the ion source device, and the mass spectrometer to produce one or more intensity versus time mass peaks for the sample. Third, the processor calculates a feature value for at least one feature of the one or more intensity versus time mass peaks. A plurality of feature values corresponding to the plurality of parameter values is produced.

The processor then calculates an optimal value for the at least one parameter from the plurality of feature values corresponding to the plurality of parameter values.

A system, method, and computer program product are disclosed for automatically calculating an optimal length of protrusion of an electrode of an ion source device using an overflow sensor. The system includes an ADE device, an OPI, an ion source device, an overflow sensor, and a processor.

The ADE device is adapted to perform one or more ejections of a sample over time. The OPI is adapted to receive the one or more ejections over time at an inlet of an inner tube, mix received ejections with a solvent to form a series of sample-solvent dilutions, and transfer the series of dilutions to an outlet of the inner tube. The ion source device is adapted to receive the series of dilutions and ionize the series of dilutions, producing an ion beam. The overflow sensor is adapted to measure a flow rate of the series of dilutions and trigger a notification if the flow rate exceeds a threshold. The overflow sensor can be an integrated part or associated with the OPI.

The processor is in communication with the ADE device, the OPI, the ion source device, and the overflow sensor. For each value of a plurality of length values for a length of protrusion of an electrode of the outlet of the inner tube of the OPI from a nozzle of the ion source device, the processor performs three steps. First, the processor sets the length to each value. Second, the processor instructs the ADE device, the OPI, and the ion source device to produce the ion beam for the sample at each flow rate value of a plurality of flow rate values until the overflow sensor triggers the notification. A plurality of flow rates is produced for each value. Third, the processor calculates a highest flow rate value for each value from the plurality of flow rates. A plurality of highest flow rate values is produced corresponding to the plurality of length values.

The processor then calculates an optimal value for the length by calculating a length value that produces a highest overflow flow rate from the plurality of highest flow rate values corresponding to the plurality of length values.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

FIG. 15 is an exemplary matrix chart that shows the one or more mass peak features that can be used to calculate the optimal values of different operational parameters of an ADE device, an OPI, or an ion source device, in accordance with various embodiments.

Figure 1A:
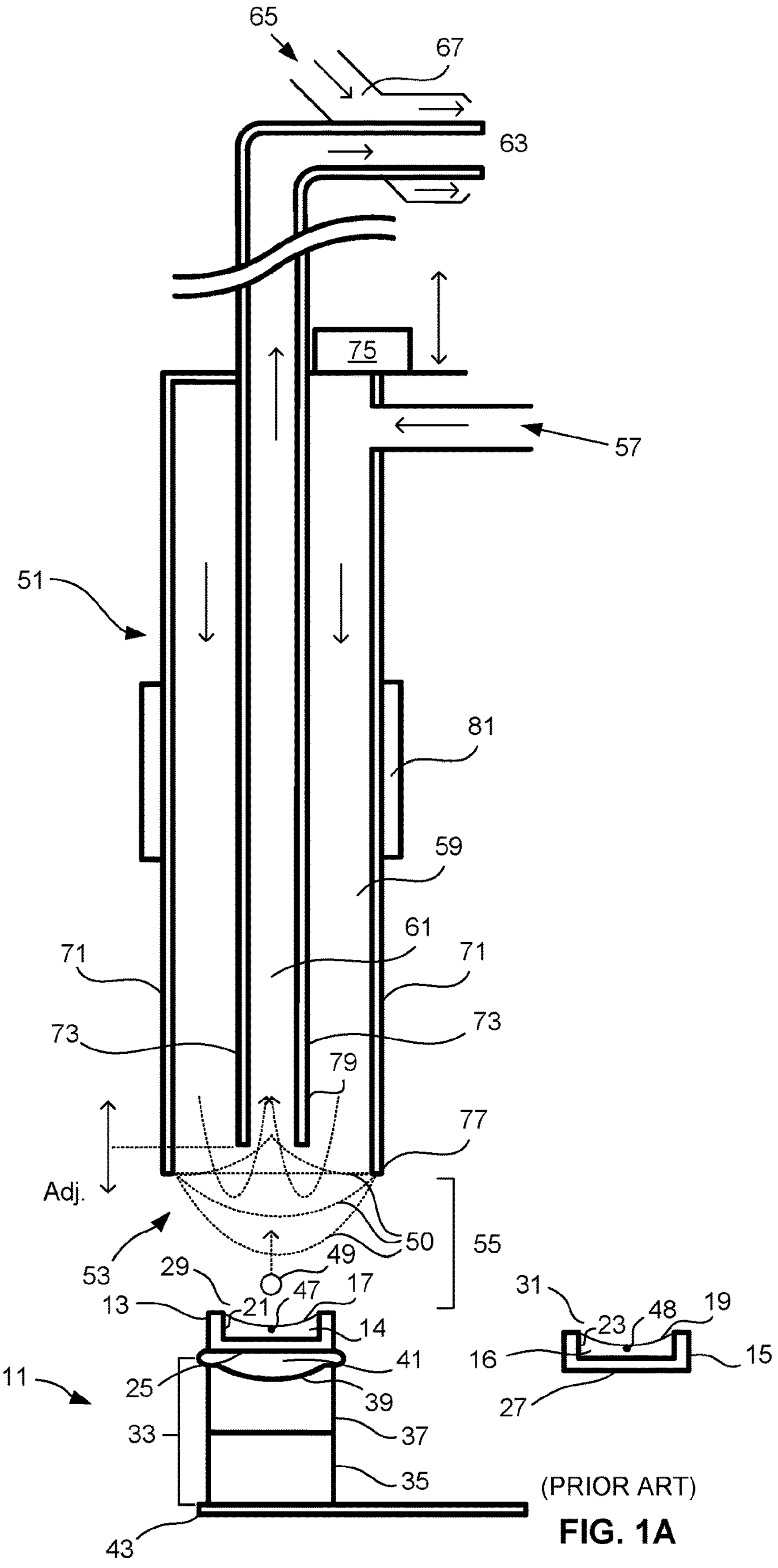
FIG. 1A is an exemplary system combining an acoustic droplet ejection (ADE) with an open port interface (OPI) sampling interface, as described in the '667 Application.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 2:
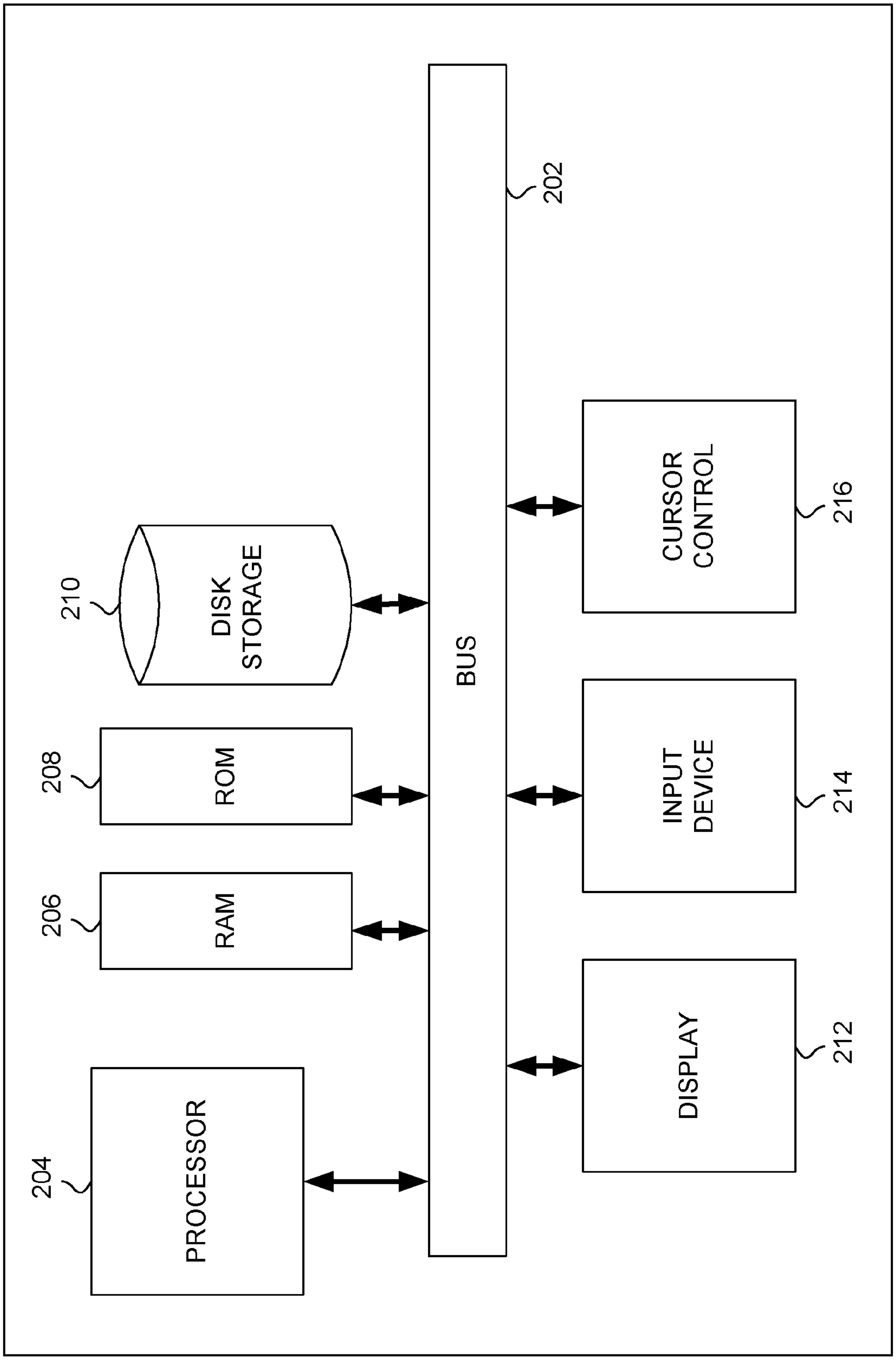
FIG. 2 is a block diagram that illustrates a computer system, upon which embodiments of the present teachings may be implemented.

FIG. 2 is a block diagram that illustrates a computer system 200, upon which embodiments of the present teachings may be implemented. Computer system 200 includes a bus 202 or other communication mechanism for communicating information, and a processor 204 coupled with bus 202 for processing information. Computer system 200 also includes a memory 206, which can be a random-access memory (RAM) or other dynamic storage device, coupled to bus 202 for storing instructions to be executed by processor 204. Memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT) or liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball or cursor direction keys for communicating direction information and command selections to processor 204 and for controlling cursor movement on display 212. This input device typically has two degrees of freedom in two axes, a first axis (i.e., x) and a second axis (i.e., y), that allows the device to specify positions in a plane.

A computer system 200 can perform the present teachings. Consistent with certain implementations of the present teachings, results are provided by computer system 200 in response to processor 204 executing one or more sequences of one or more instructions contained in memory 206. Such instructions may be read into memory 206 from another computer-readable medium, such as storage device 210. Execution of the sequences of instructions contained in memory 206 causes processor 204 to perform the process described herein. Alternatively, hard-wired circuitry may be used in place of or in combination with software instructions to implement the present teachings Thus, implementations of the present teachings are not limited to any specific combination of hardware circuitry and software.

In various embodiments, computer system 200 can be connected to one or more other computer systems, like computer system 200, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as memory 206. Transmission media includes coaxial cables, copper wire, and fiber optics, including the wires that comprise bus 202.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 204 for execution. For example, the instructions may initially be carried on the magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to memory 206, from which processor 204 retrieves and executes the instructions. The instructions received by memory 206 may optionally be stored on storage device 210 either before or after execution by processor 204.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

Calculating Optimal Parameters for an AEMS System

As described above, the analytical performance (sensitivity, reproducibility, throughput, etc.) of an acoustic ejection mass spectrometry (AEMS) system depends on the performance of the acoustic droplet ejection (ADE) device and open port interface (OPI). The performance of the ADE device and OPI depends on selecting the optimal operational conditions or parameters for these devices.

There are two types of operational parameters that need to be set for the ADE device and OPI. The first type of parameters are parameters that are set for the devices for all experiments or assays. The second type of parameters are parameters that are set for a particular experiment or a particular analyte and solution or matrix.

Unfortunately, currently, both types of parameters are set manually by a user of an AEMS system and may not be properly optimized. As a result, additional systems and methods are needed to optimally set the operational parameters of an ADE device or OPI of an AEMS system before an experiment.

In one embodiment, the operational parameters of an ADE device, an OPI, or an ion source device of an AEMS system are calculated automatically from a series of sample mass spectrometry (MS) experiments. In these experiments, the value of one or more operational parameters of the ADE device, the OPI, or the ion source device is varied and can include pump flowrate and the gas pressure/flowrate. One or more mass peaks are detected for each value of the one or more operational parameters. An optimal value for one or more operational parameters is calculated from this data.

In another embodiment, the operational parameters of an ADE device, an OPI, or an ion source device of an AEMS system are calculated automatically from a series of sample introductions to an ion source and can include gas and solvent flowrate. Again, the value of one or more operational parameters of the ADE device, the OPI, or the ion source device is varied among the sample introductions. However, in these experiments, a sensor of the AEMS is used to determine the condition of an ADE device, an OPI, or an ion source device. A condition is, therefore, detected for each value of the one or more operational parameters. An optimal value for one or more operational parameters is calculated from this data.

In various embodiments, once an optimal value for the one or more operational parameters is calculated it can be used to set the operational parameter for the ADE device, the OPI, or the ion source device. As described above, there are two types of operational parameter values that need to be set. Values of the first type are set for parameters of the devices for all experiments or assays and values of the second type are set for parameters of the devices for a particular experiment or a particular analyte and solution.

In various embodiments, values of the second type may alternatively be stored in a memory device. Each time a particular analyte and solution for a particular assay are analyzed, the values of the second type are then retrieved from the memory device and used to set parameters of the devices for the particular analyte and solution.

Alignment

Reproducible AEMS system performance relies on the good alignment of the ADE device, the sample well, and the OPI. Typically, the first step in this alignment process is the alignment of the acoustic transducer in the ADE device with the sample well. In addition to generating acoustic signals, an ADE device can also receive acoustic signals. As a result, an ADE device can be used to align itself with a sample well.

For example, an ADE device can distinguish a sample well edge from other parts of the sample well using a received acoustic signal. Consequently, to determine the center of the sample well, the simple well can be moved until the ADE device determines all of the sample wells edges. The center of the sample well is then determined from the average distances between the edges. Alternative methods include monitoring the reflection signal strength while moving along the x- and/or y-axis, but not reaching the edge. The center of the surface meniscus is determined to be point having the lowest liquid level, resulting in the highest intensity of the reflection signal.

In addition, the alignments can involve the vertical alignment also for determining an optimum positioning of the acoustic transducer vs. the sample well. Ideally the open port interface should be as close as to the top surface of the sample plate, to ensure that capture of most dispensed drops without having the plate come into contact with the OPI head while it is moving Thus, there can be a small gap, for example a ~0.3 mm air gap. If there is optimum x-y alignment, this vertical gap could be several mm. The smaller the vertical gap, the better tolerance there is for potential x-y misalignment.

Although the gap can be kept as the same across different plate types, the absolute level needs to be adjusted for different plate types, due to the different plate heights.

Once the sample well is aligned with the acoustic transducer of the ADE device, the OPI can be aligned with the ADE device. In various embodiments, the OPI is automatically aligned by moving the OPI in two axis with respect to the ADE device and measuring one or more mass peaks with each movement. From the intensities of the mass peaks detected for various locations of the OPI, the optimal location of the OPI is determined.

Alignment of the OPI with the ADE device is typically performed to find the optimal values for the relative positions of these devices. These optimal values are then set for the devices for all experiments or assays. A standard analyte and standard solution are typically, but not necessarily used to find these optimal values. The standard analyte and standard solution can be, but is not limited to, a single droplet ejection (low nL) of 100 nM dextromethorphan in water, for example. The delay time between sample ejections is, for example, two seconds.

Figure 3:
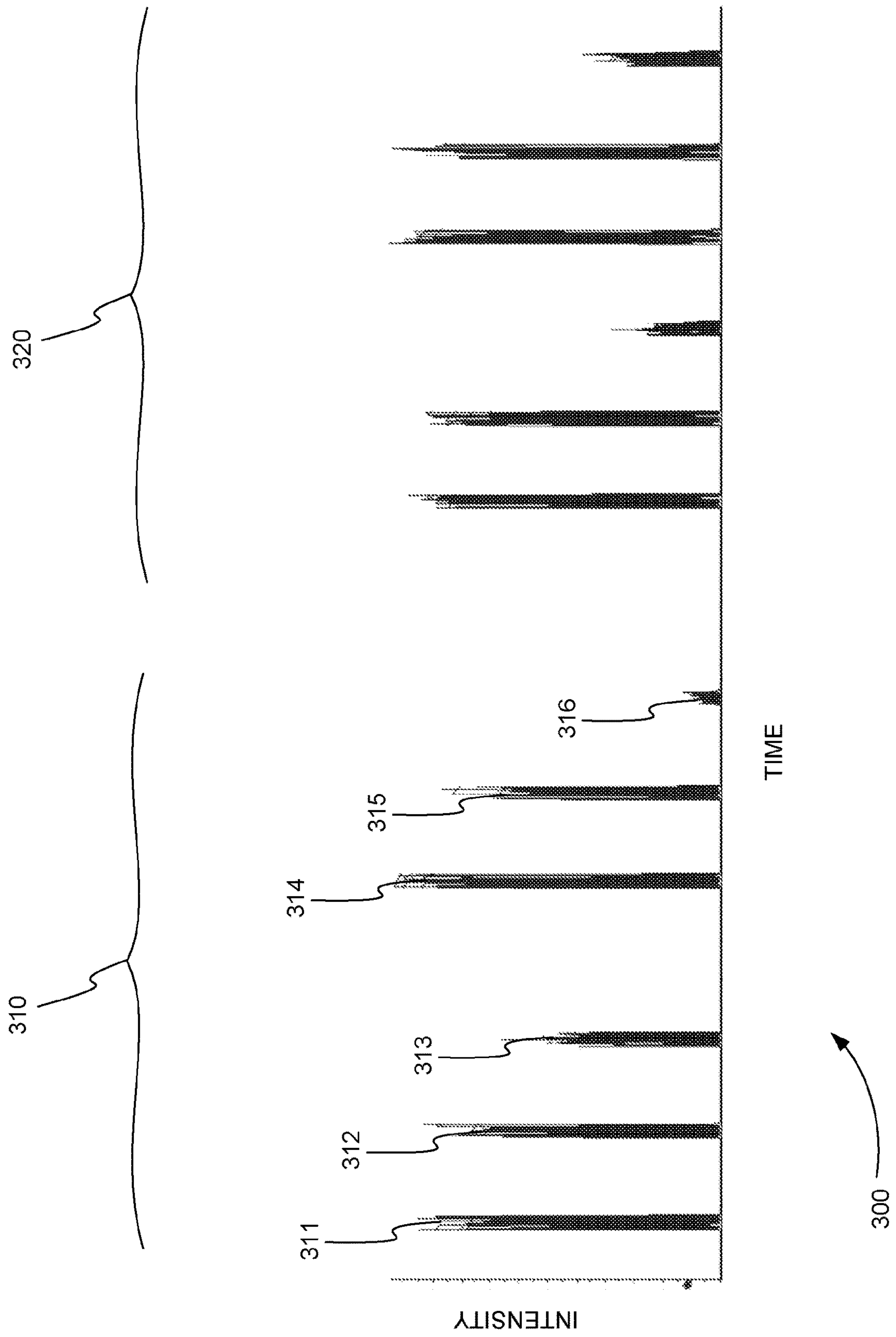
FIG. 3 is an exemplary plot of clusters of intensity versus time mass peaks detected for a standard sample for different x-axis and y-axis positions of an OPI relative to an ADE device, in accordance with various embodiments.

FIG. 3 is an exemplary plot 300 of clusters of intensity versus time mass peaks detected for a standard sample for different x-axis and y-axis positions of an OPI relative to an ADE device, in accordance with various embodiments. In plot 300, clusters 310 represent different positions along the x-axis and clusters 320 represent different positions along the y-axis, with the optimized x-axis position resulting from the process showing in 310. Each cluster includes 20 mass peaks detected for 20 sequential ejections of one droplet of the standard sample.

Cluster 311 shows the intensities detected by a mass spectrometer when the OPI is located at an initial position along the x-axis. The OPI is then moved in 200 μm steps along the x-axis. Cluster 312 shows the intensities detected by the mass spectrometer when the OPI is located 200 μm from the initial position along the x-axis. Cluster 313 shows the intensities detected by the mass spectrometer when the OPI is located 400 μm from the initial position along the x-axis.

The peaks of each cluster are compared to the previous cluster. If the peaks vary from the previous cluster by a certain intensity threshold, then an outer boundary of the alignment is reached. For example, the intensities of the peaks of cluster 313 are found to vary from the intensities of the peaks of cluster 312 by more than a certain intensity threshold. Therefore, cluster 313 delimits an x-axis boundary of the alignment using increasing 200 μm steps from the initial position.

As a result, the x-axis is then interrogated in the other direction. The OPI is moved back to the initial position and then in decreasing 200 μm steps from the initial position. For example, cluster 314 shows the intensities detected by the mass spectrometer when the OPI is located −200 μm from the initial position along the x-axis. Cluster 315 shows the intensities detected by the mass spectrometer when the OPI is located −400 μm from the initial position along the x-axis. Cluster 316 shows the intensities detected by the mass spectrometer when the OPI is located −600 μm from the initial position along the x-axis.

Again, the peaks of each cluster are compared to the previous cluster to determine if an outer boundary of the alignment is reached. In plot 300, the intensities of the peaks of cluster 316 are found to vary from the intensities of the peaks of cluster 315 by more than a certain intensity threshold. Therefore, cluster 316 is found to delimit the other x-axis boundary of the alignment.

In various embodiments, an average intensity is calculated for each of the clusters 311-316. As a result, each of the six different positions of the OPI relative to the ADE device has a corresponding average intensity, producing six average intensities corresponding to six different positions along the x-axis. The optimized x-position could then be determined with the curve-fitting for the position point with the highest MS intensity.

Clusters 320 are similarly measured at six different positions of the OPI along the y-axis. Six average intensities corresponding to six different positions along the y-axis are also calculated.

An aligned position of the OPI relative to the ADE device is calculated from the average intensities along the x-axis and the y-axis. For example, an optimal x-axis position of the OPI may be found by plotting a curve or creating a function from six average intensities corresponding to six different positions along the x-axis. The optimal x-axis position is then calculated from the curve or the function as the position with the highest average intensity. The optimal y-axis position of the OPI is found similarly.

Figure 4:
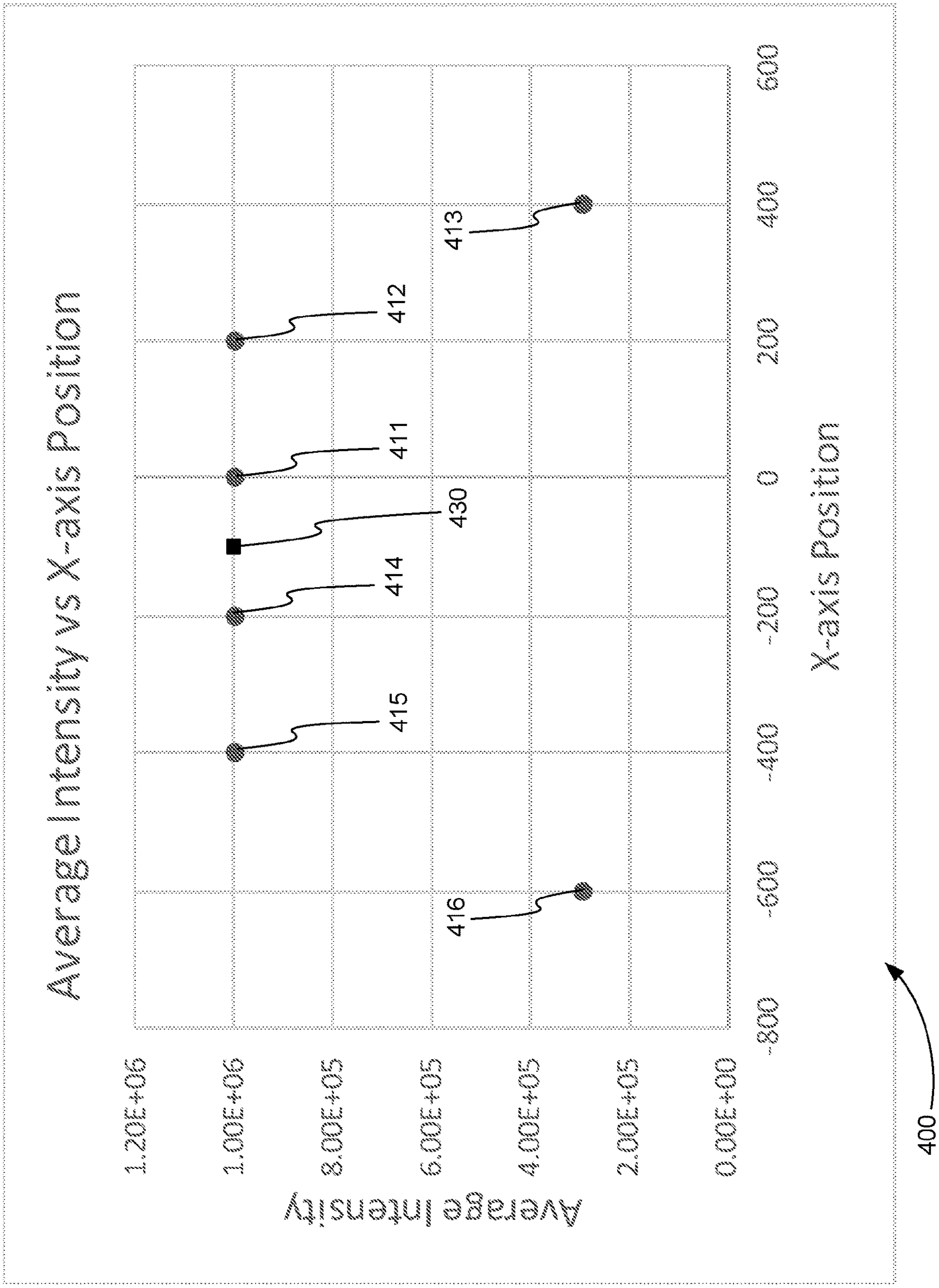
FIG. 4 is an exemplary plot showing six average peak intensities calculated from the clusters representing six different positions of the OPI along the x-axis in FIG. 3 and plotted versus those six different positions along the x-axis, in accordance with various embodiments.

FIG. 4 is an exemplary plot 400 showing six average peak intensities calculated from the clusters representing six different positions of the OPI along the x-axis in FIG. 3 and plotted versus those six different positions along the x-axis, in accordance with various embodiments. Average intensities 411, 412, 413, 414, 415, and 416 of FIG. 4 are the average peak intensities calculated for clusters 311, 312, 313, 314, 315, and 316 of FIG. 3, respectively. A curve may be fit to the points of plot 400 of FIG. 4 or a function may be derived from these points, for example, to determine the location of the OPI along the x-axis. From a curve or function, point 430 is found to be the central point with the highest intensity. Point 430 corresponds to an x-axis position of −100 μm from the initial position of the OPI.

FIG. 4 shows how an optimal value for a parameter (x position) of the OPI is calculated by calculating the value of the parameter that maximizes the average peak height or intensity of mass peaks. FIG. 4 also shows that the optimal value of the parameter does not have to be one of the values measured. A similar plot to plot 400 can be created for y-axis measurements, and an optimal value for the y-axis position of the OPI can be found similarly. These parameters are preferably set before other parameters because other parameters are generally dependent upon the correct alignment of the OPI with respect to the ADE device. If the initial point is far off, the initial ejections may not generate any signals. If this happens, a rough alignment can be utilized can be utilized with a bigger gap, e.g. 1 mm, in both directions and both axis to quickly find an initial point with a signal. Such a rough alignment step can potentially cause some droplets to be ejected to the edge, causing carryover. This could be alleviated by including some washing steps to eliminate the carryover.

OPI Inner Tube Position

FIG. 1A shows that an OPI 51 includes an inner capillary tube 73 and an outer capillary tube 71. The position of inner tube 73 relative to outer tube 71 is recessed to minimize overflow and allow solvent to flow into inner tube 73. This position of inner tube 73 relative to outer tube 71 is adjustable.

In various embodiments, the optimal position of inner tube 73 relative to outer tube 71 in OPI 51 is found automatically by moving inner tube 73 relative to outer tube 71 and measuring one or more mass peaks with each movement. From the peak intensities or peak widths of the mass peaks detected for various locations of inner tube 73 relative to outer tube 71, the optimal position of inner tube 73 is determined.

The optimal position of inner tube 73 is typically set for OPI 51 for all experiments or assays. A standard analyte and standard solution are typically used to find these optimal values. The delay time between sample ejections is, for example, two seconds.

Figure 5:
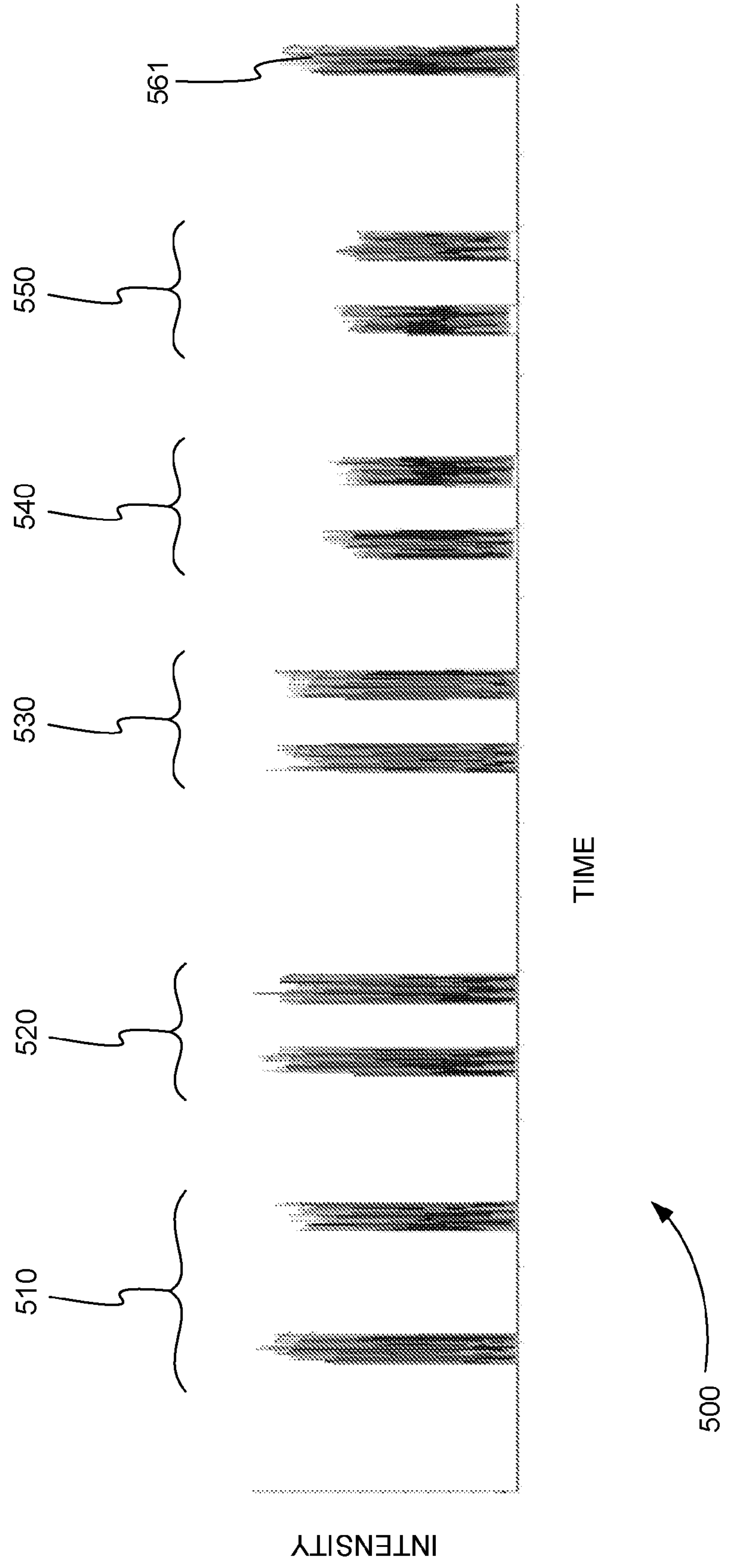
FIG. 5 is an exemplary plot of clusters of intensity versus time mass peaks detected for a standard sample for different positions of an inner tube of an OPI relative to an outer tube of the OPI, in accordance with various embodiments.

FIG. 5 is an exemplary plot 500 of clusters of intensity versus time mass peaks detected for a standard sample for different positions of an inner tube of an OPI relative to an outer tube of the OPI, in accordance with various embodiments. In plot 500, pairs or replicates of clusters 510-550 represent a different recessed position of the inner tube of the OPI. Cluster 561 represents a return to the position of pair of clusters 510. Each cluster includes 20 mass peaks detected for 20 sequential ejections of one droplet of the standard sample.

Cluster pairs 510, 520, 530, 540, and 550 correspond to a recessed position of 160 μm, 320 μm, 480 μm, 630 μm, and 790 μm, respectively, of the inner tube of an OPI. Cluster 561 corresponds to a return to the recessed position of 320 μm for the inner tube of the OPI. The cluster pairs show that the inner tube of the OPI is recessed in increasing amounts relative to the outer tube of the OPI. The range over which the inner tube is recessed is the entire operational range of the movement of the inner tube relative to the outer tube, for example.

In various embodiments, an average peak height or intensity and an average peak width are calculated for each of cluster pairs 510-550. The peak width calculated is the full width at half maximum (FWHM), for example. Since peak-height and peak-width are correlated, either could be used for the determination. As a result, each of the five different positions of the inner tube of the OPI relative to the outer tube of the OPI has a corresponding average intensity and a corresponding average peak width. Therefore, five average peak intensities corresponding to five different OPI inner tube positions and five average peak widths corresponding to five different OPI inner tube positions are produced.

An optimal position of the OPI inner tube is calculated from either the average peak intensities or the average peak widths or both the average peak intensities and the average peak widths. For example, an optimal position of the OPI inner tube may be found by plotting curves or creating functions for both the five average intensities corresponding to the five inner tube positions and the five average widths corresponding to the five inner tube positions. The optimal inner tube position is then calculated from the curves or the functions as the position with both a high average peak intensity and a narrow average peak width. An optimal inner tube position is, for example, a recessed position of 320 μm for the inner tube of the OPI. The inner tube of the OPI is then set to this optimal position as shown by cluster 561.

Figure 6:
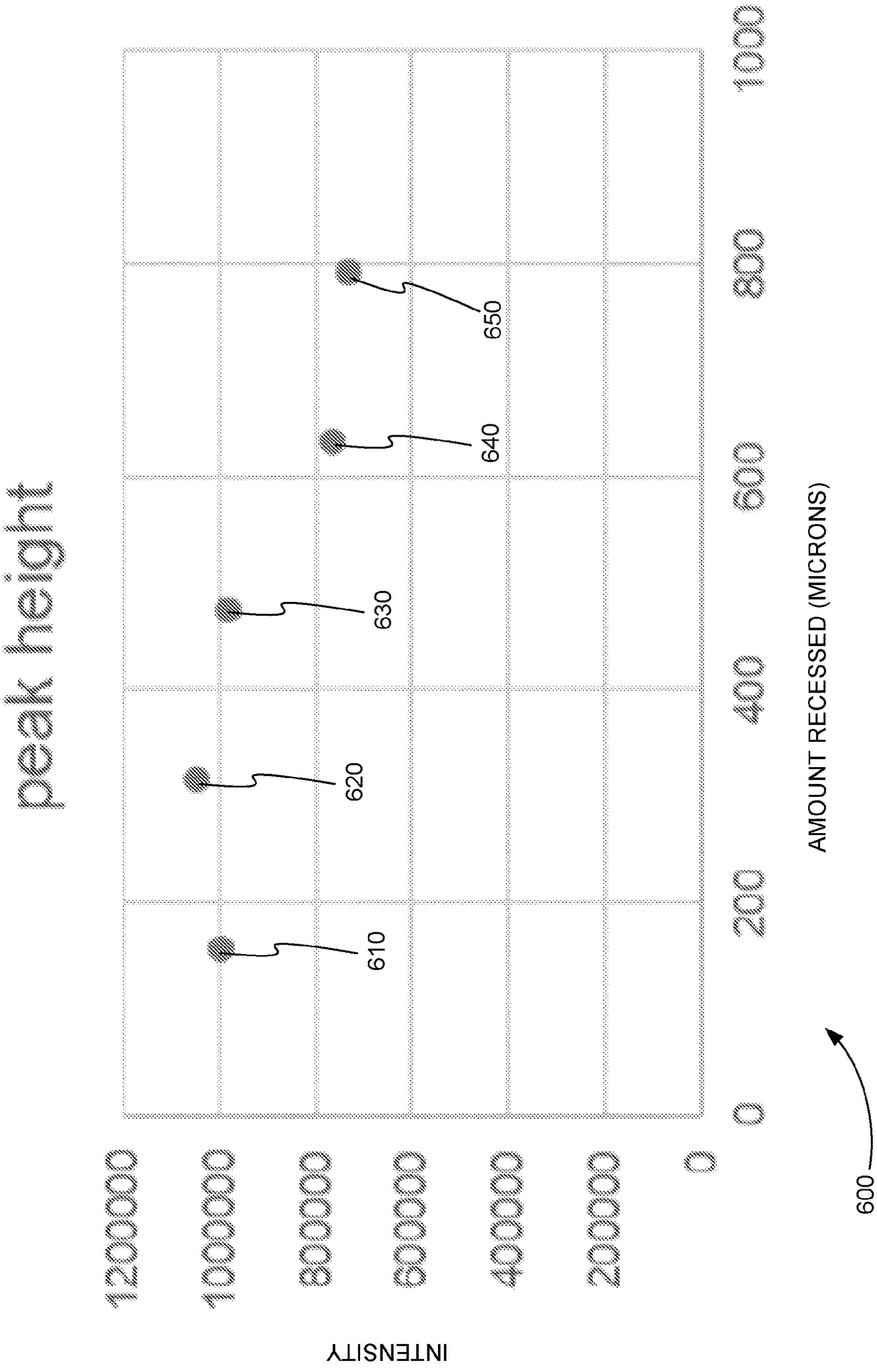
FIG. 6 is an exemplary plot showing five average peak intensities calculated from the cluster pairs representing five different recessed positions of the inner tube of the OPI in FIG. 5 and plotted versus those five different recessed positions, in accordance with various embodiments.

FIG. 6 is an exemplary plot 600 showing five average peak intensities calculated from the cluster pairs representing five different recessed positions of the inner tube of the OPI in FIG. 5 and plotted versus those five different recessed positions, in accordance with various embodiments. Average intensities 610, 620, 630, 640, and 650 of FIG. 6 are the average peak intensities calculated for cluster pairs 510, 520, 530, 540, and 550 of FIG. 5, respectively. A curve may be fit to the points of plot 600 of FIG. 6 or a function may be derived from these points, for example, to determine the optimal recessed position of the inner tube of the OPI. Alternatively, a curve or function may be used with another curve or function of another feature of the mass peaks detected, such as peak width.

Figure 7:
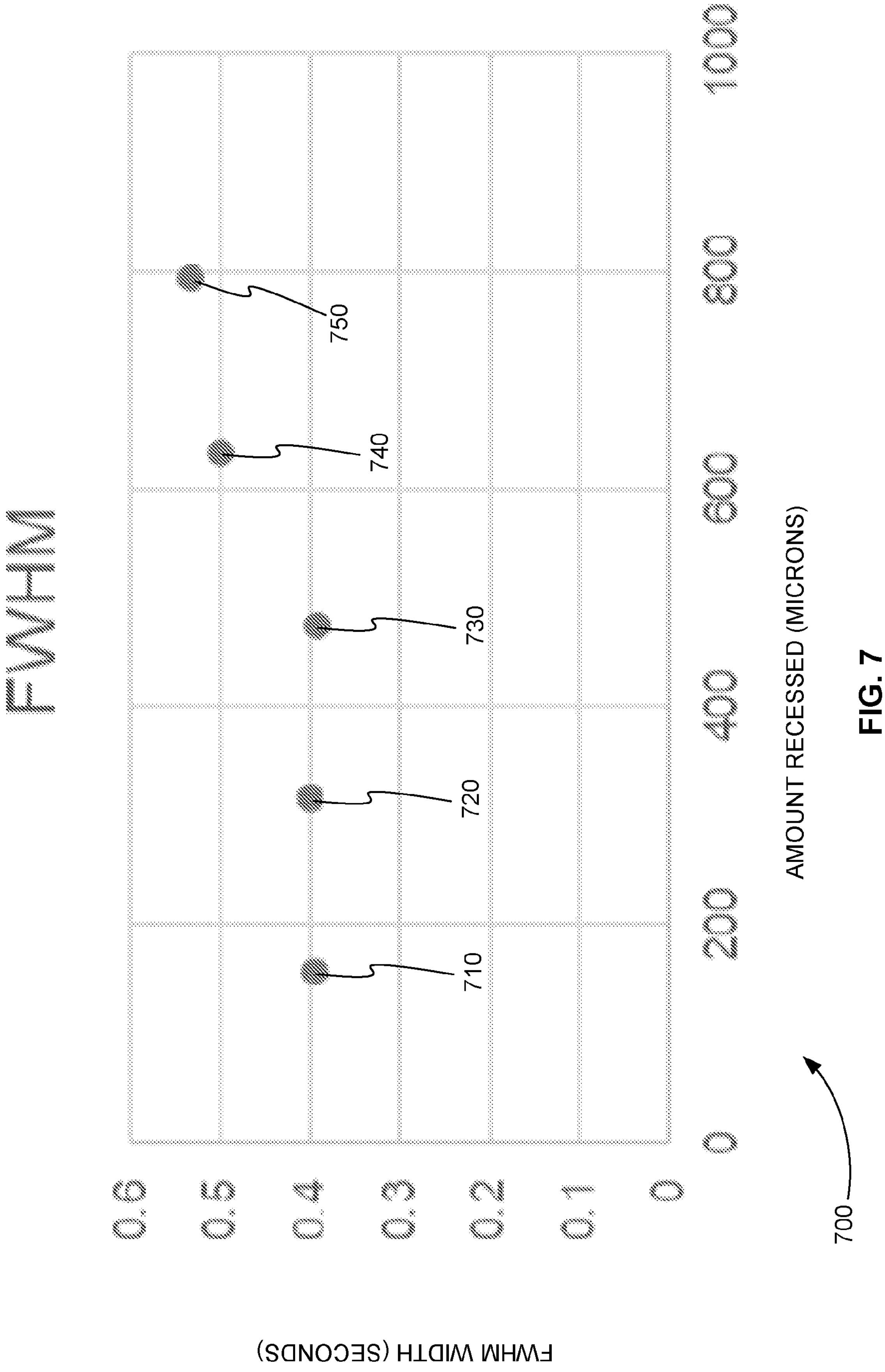
FIG. 7 is an exemplary plot showing five average peak widths calculated from the cluster pairs representing five different recessed positions of the inner tube of the OPI in FIG. 5 and plotted versus those five different recessed positions, in accordance with various embodiments.

FIG. 7 is an exemplary plot 700 showing five average peak widths calculated from the cluster pairs representing five different recessed positions of the inner tube of the OPI in FIG. 5 and plotted versus those five different recessed positions, in accordance with various embodiments. Average widths 710, 720, 730, 740, and 750 of FIG. 7 are the average peak widths (FWHM) calculated for cluster pairs 510, 520,

530, 540, and 550 of FIG. 5, respectively. A curve may be fit to the points of plot 700 of FIG. 7 or a function may be derived from these points, for example, to determine the optimal recessed position of the inner tube of the OPI. Alternatively, a curve or function may be used with another curve or function of another feature of the mass peaks detected, such as peak intensity.

In various embodiments, comparing curves fitted to the points of FIGS. 6 and 7 or comparing functions calculated from the points of FIGS. 6 and 7, an optimal value for the position of the inner tube of the OPI is found. For example, average intensity 620 is the highest average peak intensity in FIG. 6. Average intensity 620 of FIG. 6 corresponds to average peak width 720 of FIG. 7. FIG. 7 shows that average peak width 720 is close to or at the minimum peak width measured.

The goal of adjusting the inner tube of the OPP is to both increase the intensity of the mass peaks and decrease their width. As a result, the inner tube position of 320 μm corresponding to average intensity 620 of FIG. 6 and average peak width 720 of FIG. 7 is the optimal position. FIGS. 6 and 7, therefore, show how two features (intensity and width) of measured mass peaks can be used to find an optimal value for a parameter of an OPI. In various alternative embodiments, just one feature of measured mass peaks can be used to find an optimal value for the position of the inner tube of an OPI. In one example, if there is a wide range for the parameter setting achieving the similar level of the optimized performance, a middle value of that range could be utilized.

Electrode Protrusion From ESI Nozzle

Figure 1B:
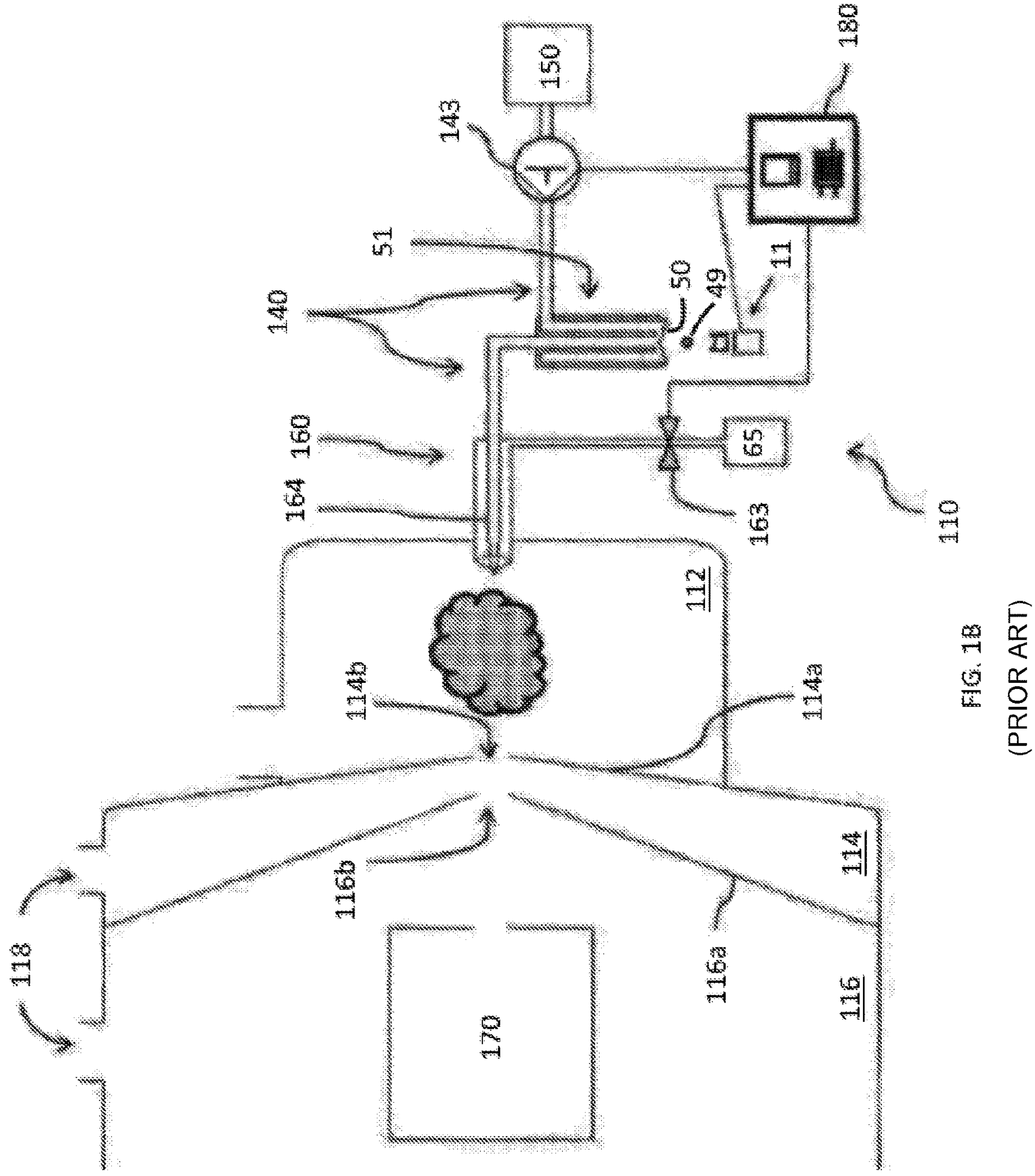
FIG. 1B (PRIOR ART)
FIG. 1B is an exemplary system for ionizing and mass analyzing analytes received within an open end of a sampling OPI, as described in the '667 Application.

FIG. 1B shows electrode 164 fed by OPI 51 protruding from ion source 160. The length of protrusion of electrode 164 from a nozzle of ion source 160 is an adjustable parameter of the ion source device. Ion source 160 can be, for example, an electrospray ion source (ESI) device.

The optimal length of protrusion of electrode 164 from a nozzle of ion source 160 is found automatically using at least two different methods. In a first method, in accordance with various embodiments, the optimal length of protrusion of electrode 164 from a nozzle of ion source 160 is found automatically by moving electrode 164 relative to the nozzle of ion source 160 and monitoring the flow rate of the sample-solvent dilution of OPI 51 using an overflow sensor. For example, the length of protrusion of electrode 164 from a nozzle of ion source 160 is varied over a number of different lengths.

For each length, the flow rate of the sample-solvent dilution of OPI 51 is also varied over a number of different flow rates until the overflow sensor is triggered. The optimal length of protrusion is found by determining the length that produces the highest overflow rate, though other parameters may be monitored as well. The overflow sensor can also include the monitoring of a meniscus.

In a second method, in accordance with various embodiments, the optimal length of protrusion of electrode 164 from a nozzle of ion source 160 is found automatically by moving electrode 164 relative to the nozzle of ion source 160 and measuring one or more mass peaks. In general, the optimal length of protrusion is found by determining the length that has the highest flow rate to achieve a peak width less than a certain threshold peak width. For example, the length of protrusion of electrode 164 from a nozzle of ion source 160 is varied over a number of different lengths. For each length, the flow rate of the sample-solvent dilution of OPI 51 is also varied over a number of different flow rates and the peak width of the mass peaks measured for each flow rate is measured.

For each length, the highest flow rate that produces a peak width less than a threshold peak width is calculated or determined. A threshold peak width is, for example, an FWHM of 0.4 sec. The optimal length of protrusion is then found by determining the length that produces the highest flow rate.

Both methods of determining the optimal length of protrusion of electrode 164 from a nozzle of ion source 160 vary the flow rate in addition to the protrusion length. The optimal protrusion length is set for the ion source device for all experiments or assays or can be varied based on other parameters such as for example the nebulizer flowrate. A standard analyte and standard solution are typically used to find these optimal values. A starting protrusion length is 0.3 mm, for example. The delay time between sample ejections is, for example, two seconds.

Flow Rate

Once the optimal length of protrusion of electrode 164 from a nozzle of ion source 160 is found, the optimal flow rate is preferably determined automatically. In various embodiments, the optimal flow rate of the sample-solvent dilution of OPI 51 is found automatically by varying the flow rate and measuring one or more mass peaks for each different flow rate. From peak intensities of the mass peaks detected, peak widths of the mass peaks detected, delay times measured between sample ejections and detected mass peaks, or any combination of these measurements, the optimal flow rate is determined.

The optimal flow rate is typically set for an OPI for all experiments or assays. A standard analyte and standard solution are typically used to find these optimal values. The delay time between sample ejections is, for example, two seconds. A starting flow rate is, for example, 150 μL/min lower than the overflow condition.

Figure 8:
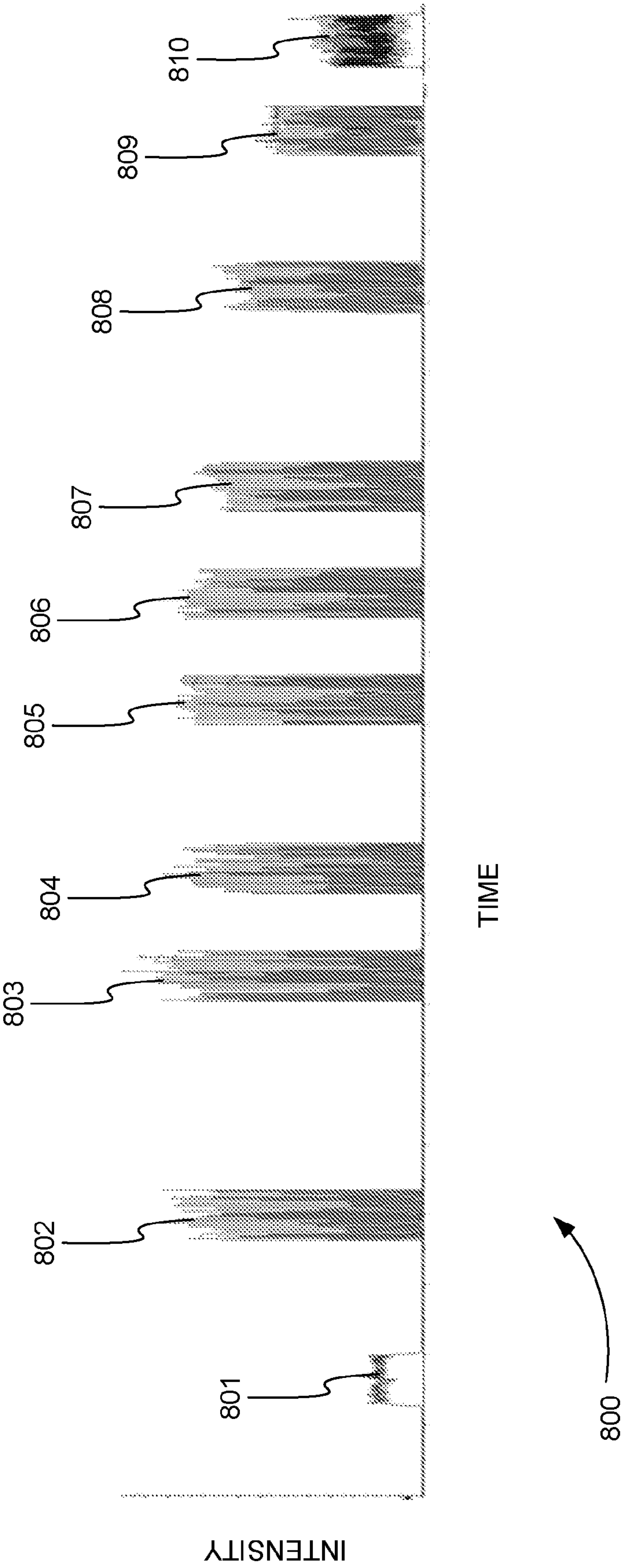
FIG. 8 is an exemplary plot of clusters of intensity versus time mass peaks detected for a standard sample for different flow rates of an OPI using an electrode protrusion length of 300 μm, in accordance with various embodiments.

FIG. 8 is an exemplary plot 800 of clusters of intensity versus time mass peaks detected for a standard sample for different flow rates of an OPI using an electrode protrusion length of 300 μm, in accordance with various embodiments. In plot 800, clusters 801-810 represent different flow rates of the OPI. Each cluster includes 20 mass peaks detected for 20 sequential ejections of one droplet of the standard sample.

Clusters 801, 802, 803, 804, 805, 806, 807, 808, 809, and 810 correspond to flow rates of 410, 380, 350, 320, 290, 260, 230, 200, 170, and 140 μL/min, respectively. The clusters show that the flow rate of the OPI is decreased in steps 30 of μL/min.

In various embodiments, one or more of an average peak height or intensity, an average peak width, or an average delay time between a sample ejection and a detected mass peak are calculated for each of clusters 801-810. The peak width calculated is the FWHM, for example. As a result, each of the ten different flow rates the OPI has one or more of an average peak intensity, an average peak width, or an average delay time between a sample ejection and a detected mass peak.

An optimal flow rate is calculated from one or more of an average peak intensity, an average peak width, or an average delay time between a sample ejection, a detected mass peak or CV of the peak height (or peak width). For example, an optimal flow rate may be found by plotting curves or creating functions for both the ten average peak widths corresponding to the ten flow rates and the 10 delay times corresponding to the 10 flow rates. The optimal flow rate is then calculated from the curves or the functions as the flow rate with both a narrow average peak width and a longer delay time.

Figure 9:
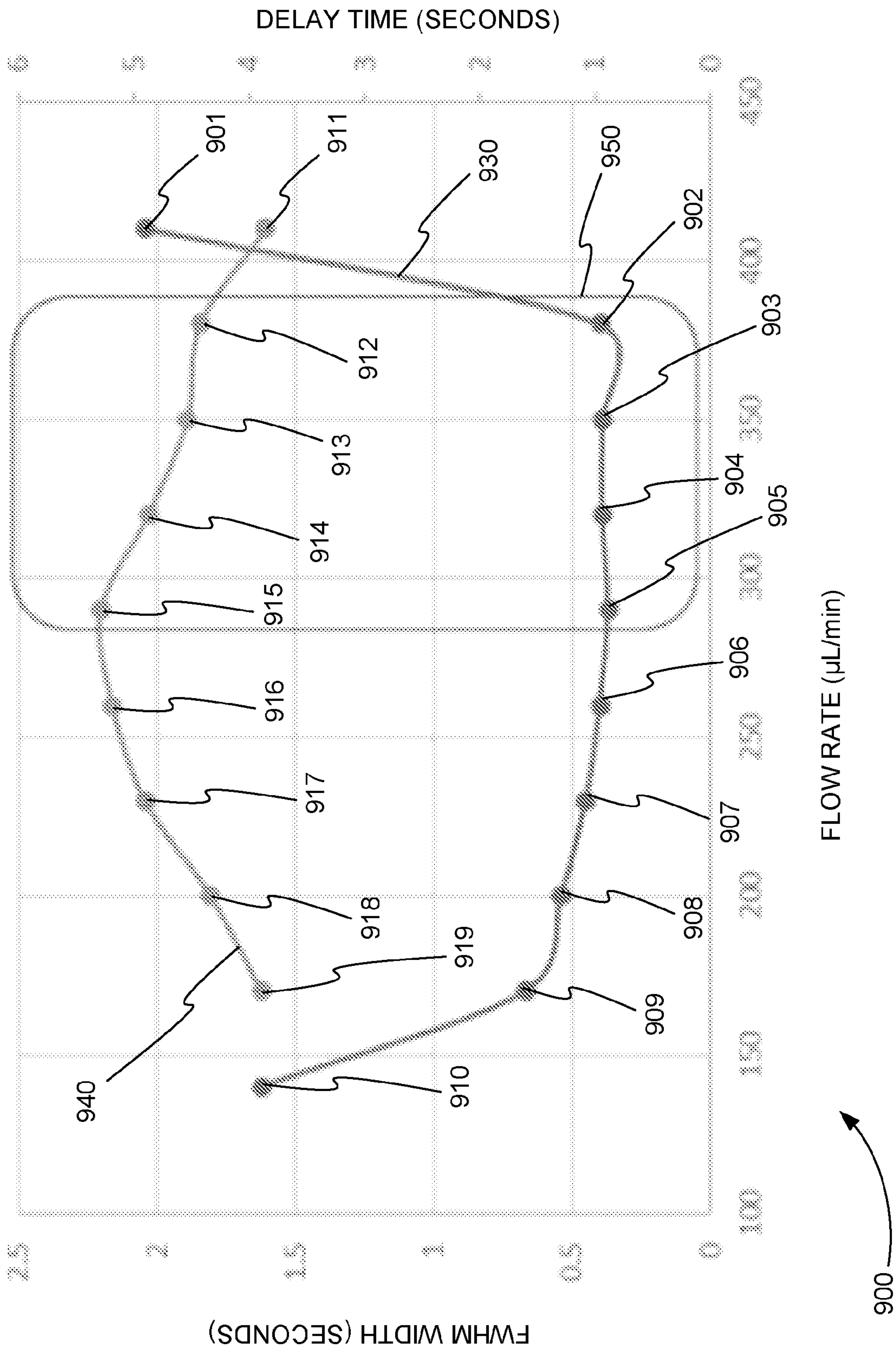
FIG. 9 is an exemplary plot showing ten average peak widths and nine average delay times calculated from the clusters representing the ten different flow rates of the OPI in FIG. 8 and plotted versus flow rate, in accordance with various embodiments.

FIG. 9 is an exemplary plot 900 showing ten average peak widths and nine average delay times calculated from the clusters representing the ten different flow rates of the OPI in FIG. 8 and plotted versus flow rate, in accordance with various embodiments. Average widths 901, 902, 903, 904, 905, 906, 907, 908, 909, and 910 of FIG. 9 are the average peak widths calculated for clusters 801, 802, 803, 804, 805, 806, 807, 808, 809, and 810 of FIG. 8, respectively. Curve 930 can be fit to the average peak width points of plot 900 of FIG. 9 or a function may be derived from these points, for example, to determine the optimal flow rate.

Average delay times 911, 912, 913, 914, 915, 916, 917, 918, and 919 of FIG. 9 are the average delay times calculated for clusters 801, 802, 803, 804, 805, 806, 807, 808, and 809 of FIG. 8, respectively. Curve 940 can be fit to the delay time points of plot 900 of FIG. 9 or a function may be derived from these points, for example, to determine the optimal flow rate.

In various embodiments, both the average peak widths and average delay times can be used to determine the optimal flow rate. For example, square 950 highlights the flow rate range in which the measurements provide both a narrow average peak width and a longer delay time. An optimal flow rate can be selected from the range provided by square 950.

Figure 10:
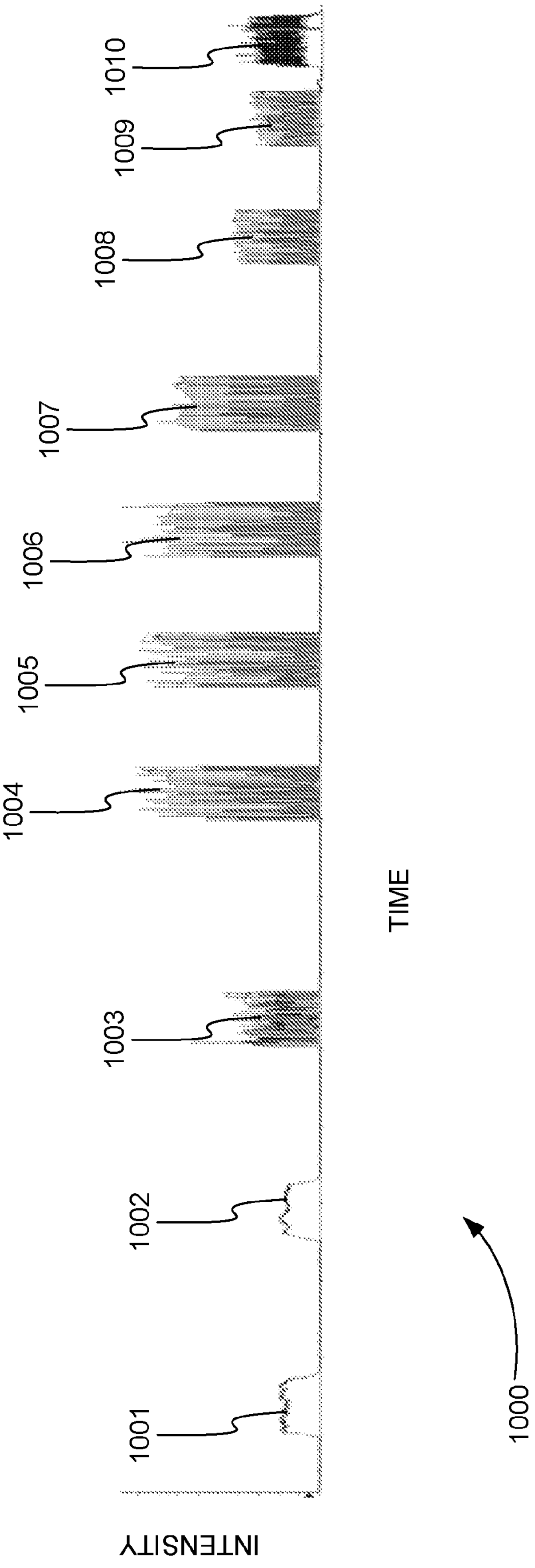
FIG. 10 is an exemplary plot of clusters of intensity versus time mass peaks detected for a standard sample for different flow rates of an OPI using an electrode protrusion length of 750 μm, in accordance with various embodiments.

FIG. 10 is an exemplary plot 1000 of clusters of intensity versus time mass peaks detected for a standard sample for different flow rates of an OPI using an electrode protrusion length of 750 μm, in accordance with various embodiments. In plot 1000, clusters 1001-1010 represent different flow rates of the OPI. Each cluster includes 20 mass peaks detected for 20 sequential ejections of one droplet of the standard sample.

Clusters 1001, 1002, 1003, 1004, 1005, 1006, 1007, 1008, 1009, and 1010 correspond to flow rates of 350, 320, 290, 260, 230, 200, 170, 140, 110, and 80 μL/min, respectively. The clusters show that the flow rate of the OPI is decreased in steps 30 of μL/min.

In various embodiments, one or more of an average peak height or intensity, an average peak width, or an average delay time between a sample ejection and a detected mass peak are calculated for each of clusters 1001-1010. The peak width calculated is the FWHM, for example. As a result, each of the ten different flow rates the OPI has one or more of an average peak intensity, an average peak width, or an average delay time between a sample ejection and a detected mass peak.

An optimal flow rate is calculated from one or more of an average peak intensity, an average peak width, or an average delay time between a sample ejection and a detected mass peak. For example, an optimal flow rate may be found by plotting curves or creating functions for both the ten average peak widths corresponding to the ten flow rates and the 10 delay times corresponding to the 10 flow rates. The optimal flow rate is then calculated from the curves or the functions as the flow rate with both a narrow average peak width and a longer delay time.

Figure 11:
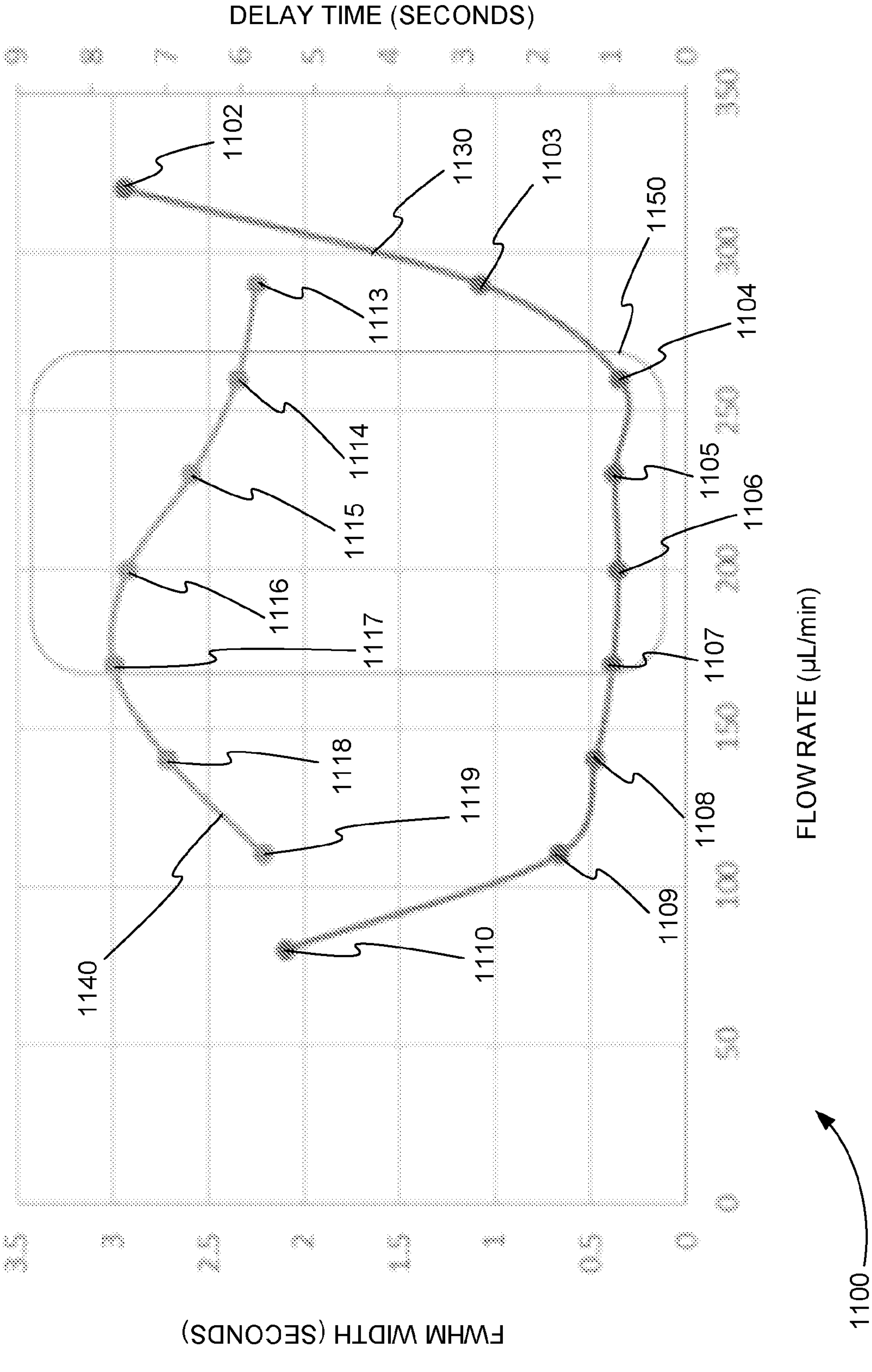
FIG. 11 is an exemplary plot showing nine average peak widths and seven average delay times calculated from the clusters representing the ten different flow rates of the OPI in FIG. 10 and plotted versus flow rate, in accordance with various embodiments.

FIG. 11 is an exemplary plot 1100 showing nine average peak widths and seven average delay times calculated from the clusters representing the ten different flow rates of the OPI in FIG. 10 and plotted versus flow rate, in accordance with various embodiments. Average widths 1102, 1103, 1104, 1105, 1106, 1107, 1108, 1109 and 1110 of FIG. 11 are the average peak widths calculated for clusters 1002, 1003, 1004, 1005, 1006, 1007, 1008, 1009 and 1010 of FIG. 10, respectively. Curve 1130 can be fit to the average peak width points of plot 1100 of FIG. 11 or a function may be derived from these points, for example, to determine the optimal flow rate.

Average delay times 1113, 1114, 1115, 1116, 1117, 1118, and 1119 of FIG. 11 are the average delay times calculated for clusters 1003, 1004, 1005, 1006, 1007, 1008, and 1009 of FIG. 10, respectively. Curve 1140 can be fit to the delay time points of plot 1100 of FIG. 11 or a function may be derived from these points, for example, to determine the optimal flow rate.

In various embodiments, both the average peak widths and average delay times can be used to determine the optimal flow rate. For example, square 1150 highlights the flow rate range in which the measurements provide both a narrow average peak width and a longer delay time. An optimal flow rate can be selected from the range provided by square 1150.

FIGS. 8-11 show how two features (width and delay time) of measured mass peaks can be used to find an optimal value for a parameter of an OPI. In various alternative embodiments, just one feature of measured mass peaks can be used to find an optimal value for the flow rate of an OPI.

FIGS. 8-11 also show how the length of electrode protrusion can affect the optimal flow rate. FIG. 9 shows that the range for the optimal flow rate is between 280 and 390 μL/min for an electrode protrusion length of 300 μm as delimited by square 950. In contrast, FIG. 11 shows that the range for the optimal flow rate is between 170 and 270 μL/min for an electrode protrusion length of 750 μm as delimited by square 1150. This comparison shows that an increasing electrode protrusion length decreases the optimal flow rate.

Ejection Volume

An optimal ejection sample volume provided by an ADE device provides an optimal sensitivity for an AEMS experiment. For a "clean" matrix or solution, for example, the sensitivity can be improved simply by increasing the sample loading amount within a range (e.g., <200 nL, preferably <20 nL). However, when the matrix is complex, increasing the ejection volume does not always help the sensitivity due to ionization suppression. In various embodiments, the optimization of the ejection volume for the best sensitivity is achieved by monitoring the intensity of the mass peaks detected while changing the ejection volume.

To adjust the sample volume, an ADE device can vary the volume of fluid ejected in each droplet or can increase the number of droplets ejected to produce a single sample ejection. In the later case, the droplets are ejected with high frequency causing the droplets to merge together as a single ejection with higher volume then any single droplet. These methods can be combined together. For some ADE devices, the range of different volumes that can be ejected in each droplet is limited. For example, for some ADE devices, the volume range for a droplet can be between one and 10 nL. Consequently, such devices cannot eject a 50 nL droplet, for example.

As a result, in various embodiments, varying the number of droplets ejected to produce a single sample ejection is a preferred method of increasing the volume. For example, ejecting multiple drops at a high rate of ejection causes the multiple drops to merge at the OPI and become a single ejection with a higher ejection volume. A high rate of ejection can be, but is not limited to, five drops per second.

In various embodiments, the optimal ejection volume of an ADE device is found automatically by varying the ejection volume and measuring one or more mass peaks for each ejection volume. From the peak intensities of the mass peaks detected for various ejection volumes, the optimal ejection volume is determined.

The optimal ejection volume is typically set or stored in a memory device for a specific analyte and analyte solution or matrix or at a given flowrate. If the optimal ejection volume for a specific analyte and a specific analyte solution is stored in a memory device, it can be retrieved from the memory device and the ADE device can be set with that optimal ejection volume each time that analyte in that analyte solution is analyzed.

Figure 12:
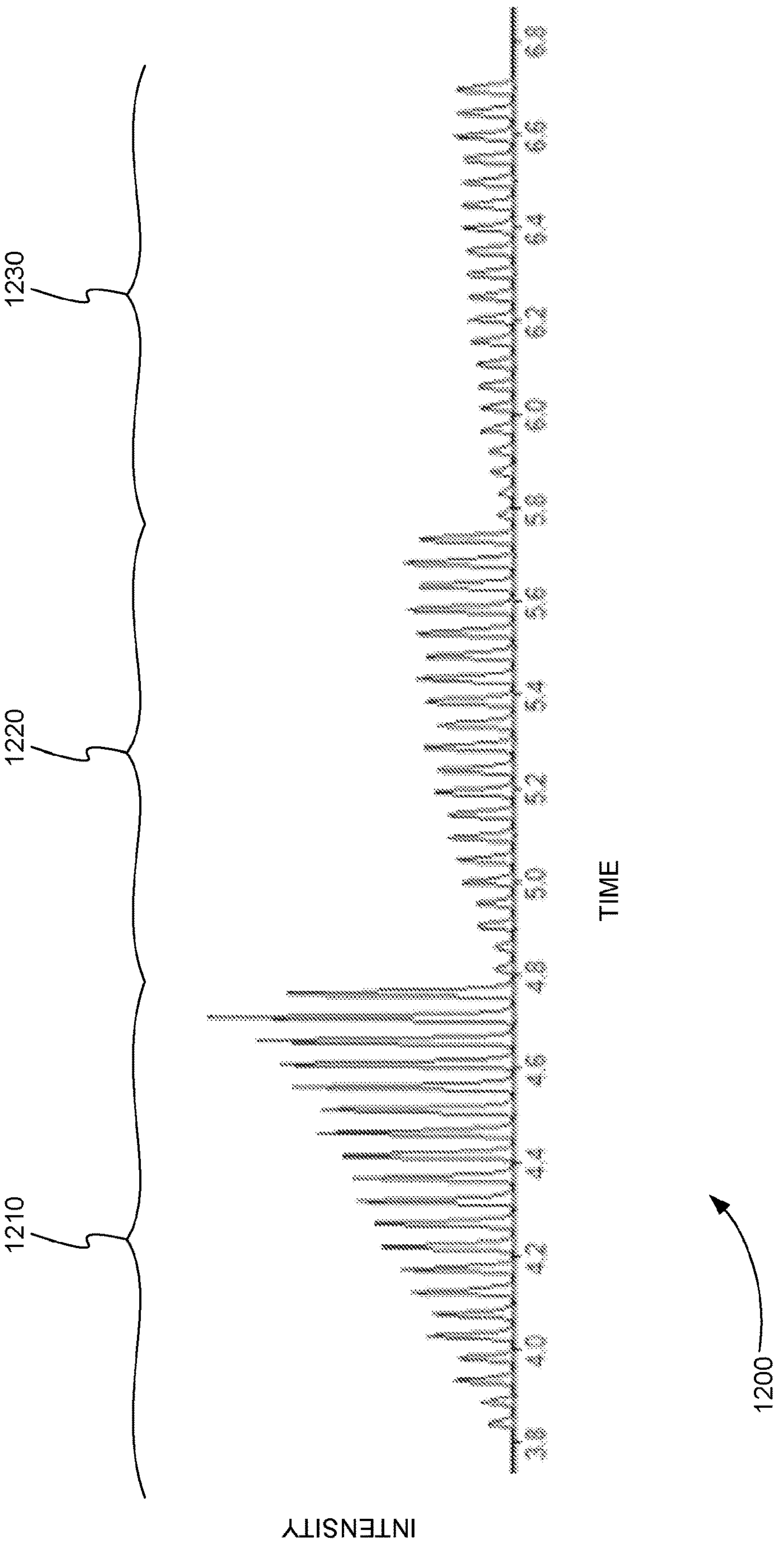
FIG. 12 is an exemplary plot of a series of intensity versus time mass peaks detected for a standard sample from three different types of solutions showing that the intensities of the mass peaks vary differently with increasing ejection volume depending on the type of solution used, in accordance with various embodiments.

FIG. 12 is an exemplary plot 1200 of a series of intensity versus time mass peaks detected for a standard sample from three different types of solutions showing that the intensities of the mass peaks vary differently with increasing ejection volume depending on the type of solution used, in accordance with various embodiments. Plot 1200 shows three different series of intensity versus time mass peaks 1210, 1220, and 1230.

In each series of peaks, the same standard compound is analyzed. Also, in each series of peaks, 10 different sample ejection volumes are used. These different sample ejection volumes are created using a different number of drops per sample ejection. The initial number of drops is one. This is increased in steps of one drop all the way up to a maximum of 10 drops. Each different sample ejection volume is performed twice. As a result, there are a pair of mass peaks for each different ejection volume in each series of peaks. This results in a total of 20 peaks in each series of peaks.

Series of peaks 1210 represents intensities measured for the standard compound in water. Series 1210 shows that the intensities of the measured peaks steadily increase with increasing ejection volume. For such a "clean" solution or matrix, the optimal ejection volume is, therefore, the highest ejection volume.

Series of peaks 1220 represents intensities measured for the standard compound in a crashed NIST plasma. Series of peaks 1230 represents intensities measured for the standard compound in a crashed high lipids plasma. Series 1220 and 1230 show that the intensities of the measured peaks stop increasing with increasing ejection volume after an ejection volume made up of about four or five drops. As a result, for these solutions or matrices, the optimal ejection volume is about four or five drops per sample ejection.

Series of peaks 1210, 1220, and 1230 show that the intensities of mass peaks produced with increasing ejection volume vary differently depending on the solution or matrix used. As a result, an optimal ejection volume for a particular matrix or assay can be found automatically through the type of tuning shown in FIG. 12.

Finding the optimal ejection volume will be determined by an assay's requirement. Typically an ejection volume would be utilized that achieves the upper limit of the linear peak-height increase. In certain cases, this would not be preferred such as for example, if the max volume for linear peak-height increase range still not enough for the required assay sensitivity, the ejection volume could be further increased until the desired sensitivity achieved or in some complex matrixes, as long as the assay sensitivity requirement could be met, it may be desirable to limit the ejection volume to be as low as possible to avoid the potential system contamination and improve the life time of electrode.

Ejection Delay Time

The analytical throughput of an AEMS system can be adjusted by changing the delay time between ejections of an ADE device. The shortest delay time (for the best analytical throughput) should satisfy the requirement of accurate quantification for all ejections. In cases where absolute quantification is not required, throughout can be faster. This required delay time, however, is dependent on the required concentration dynamic range between adjacent ejections.

In various embodiments, the throughput is optimized by changing the delay time of an ADE device and determining if the peak area of an ejection right after an ejection that produces a much larger peak is similar to the peak area of an ejection that does not follow an ejection that produces a much larger peak. In other words, the throughput is optimized by changing the delay time and determining when a peak following a much larger peak is no longer convolved with the larger peak by monitoring the peak area.

In various embodiments, the optimal ejection delay time of an ADE device is found automatically by varying the ejection delay time and measuring one or more mass peaks for each ejection delay time. From the peak areas of the mass peaks detected for various ejection delay times, the optimal ejection delay time is determined.

The optimal ejection delay time is typically set or stored in a memory device for a specific analyte and analyte solution or matrix. If the optimal ejection delay time for a specific analyte and a specific analyte solution is stored in a memory device, it can be retrieved from the memory device and the ADE device can be set with that optimal ejection delay time each time that analyte in that analyte solution is analyzed.

Figure 13:
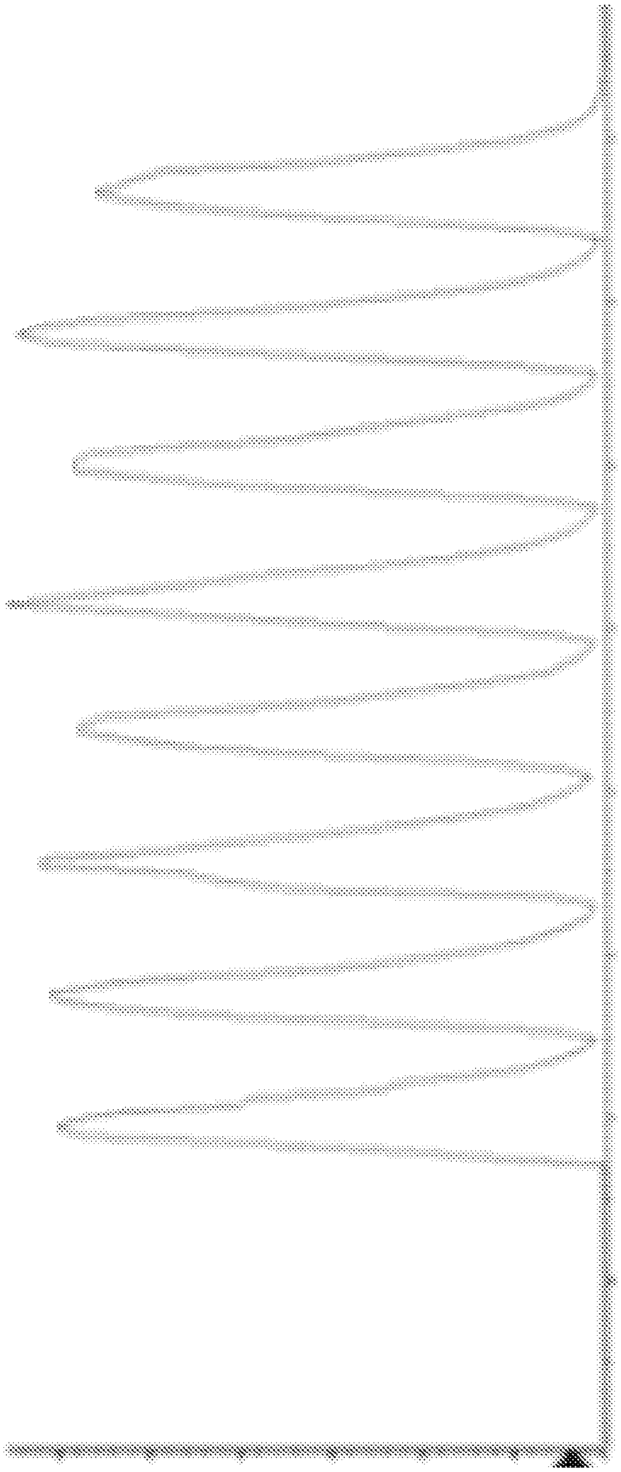
FIG. 13 is an exemplary plot of a series of intensity versus time mass peaks detected for a standard sample ejected from the same well showing the distance between peaks can be optimized when samples have a similar concentration, in accordance with various embodiments.

FIG. 13 is an exemplary plot 1300 of a series of intensity versus time mass peaks detected for a standard sample ejected from the same well showing the distance between peaks can be optimized when samples have a similar concentration, in accordance with various embodiments. In plot 1300, the eight peaks all have a similar intensity. This is because they were all produced for a sample from the same well and, therefore, for samples with the same concentration. As a result, the distance between peaks is minimized by reducing the ejection delay time. The ejection delay time used to produce the peaks of plot 1300 is 0.98 seconds.

When peaks are produced from different concentrations of the sample, however, their intensities can vary significantly. This occurs, for example, when a sample is analyzed using different wells that have different sample concentrations.

Figure 14:
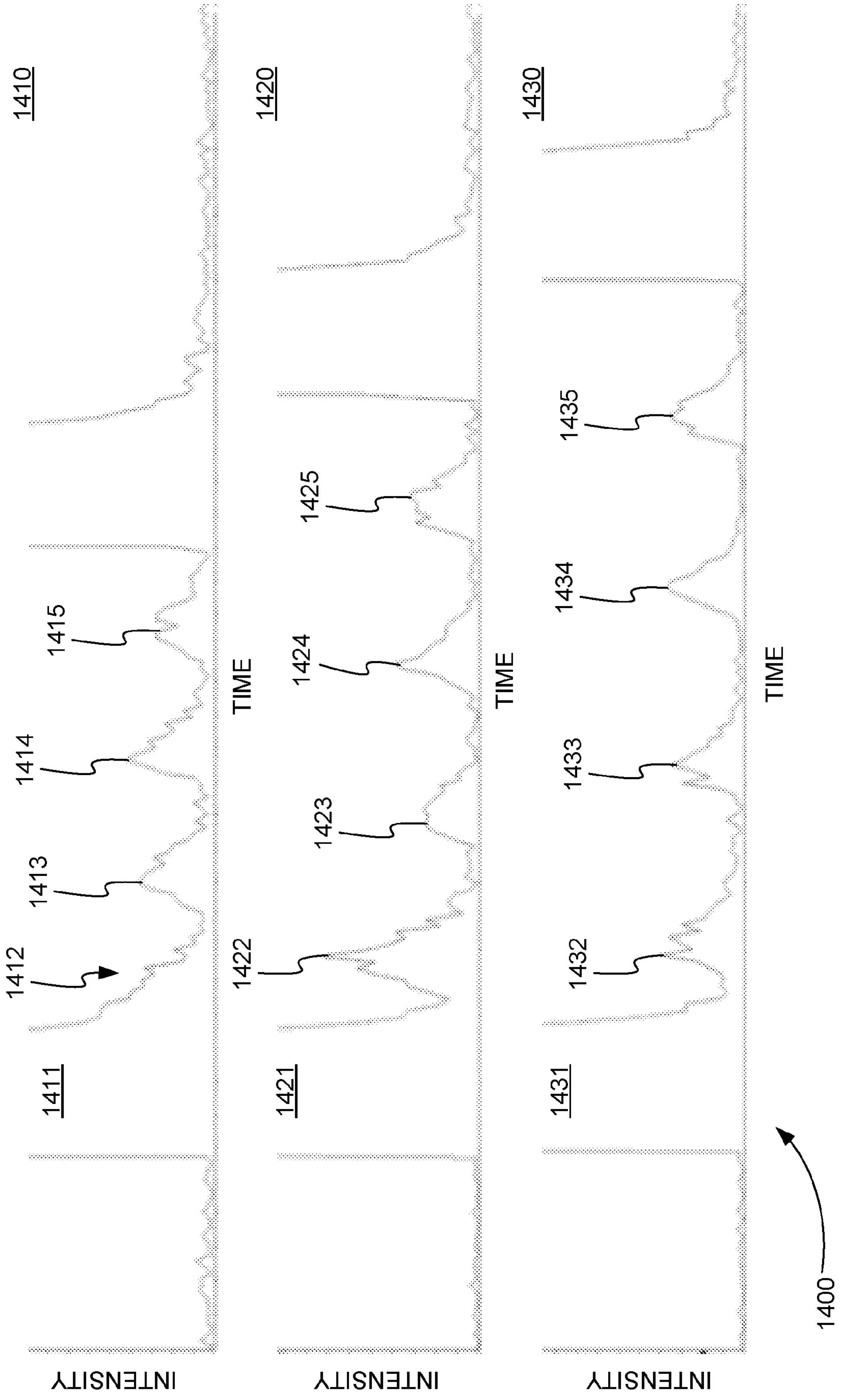
FIG. 14 is an exemplary series of intensity versus time mass peak plots from three different experiments in which a different ejection delay time was used to eject a sample from a series of different wells, in accordance with various embodiments.

FIG. 14 is an exemplary series 1400 of intensity versus time mass peak plots from three different experiments in which a different ejection delay time was used to eject a sample from a series of different wells, in accordance with various embodiments. The concentration in each first well of each series of five wells is three orders of magnitude greater than the concentration in the other four wells.

The results for a first experiment in which the ejection delay time is 1.09 seconds are shown in plot 1410. First peak 1411 corresponds to a first well that has a concentration of the sample that is three orders of magnitude greater than the following four wells. Peak 1411 has an intensity much greater than the intensity range shown in the plot. Peak 1411 is so large or intense that it subsumes peak 1412, which is the peak that immediately follows it. In other words, peak 1411 is so intense that peak 1412 becomes convolved with peak 1411. Peaks 1413, 1414, and 1415 follow peak 1412 and are from wells that have a similar concentration to the well that produced peak 1412.

Peak 1412 can be estimated by a peak finding algorithm from the convolution with peak 1411. In various embodiments, the area of estimated peak 1412 is then compared to one or more areas of peaks 1413, 1414, and 1415 within an area threshold. Due to the convolution with peak 1411, however, the area of estimated peak 1412 is unlikely to match one or more areas of peaks 1413, 1414, and 1415 within an area threshold. As a result, the ejection delay time of 1.09 seconds used for the results of plot 1410 is not optimal for the sample concentrations being used.

The results for a second experiment in which the ejection delay time is 1.37 seconds are shown in plot 1420. Again, first peak 1421 corresponds to a first well that has a concentration of the sample that is three orders of magnitude greater than the following four wells. Due to the increased ejection delay time, peak 1421 does not completely subsume peak 1422, which is the peak that immediately follows it. However, it still distorts the shape of peak 1422. In other words, peak 1422 is still convolved with peak 1421. Peaks 1423, 1424, and 1425 follow peak 1422 and are from wells that have a similar concentration to the well that produced peak 1422.

Again, peak 1422 can be estimated by a peak finding algorithm from the convolution with peak 1421. In various embodiments, the area of estimated peak 1422 is then compared to one or more areas of peaks 1423, 1424, and 1425 within an area threshold. Due to the convolution with peak 1421, however, the area of estimated peak 1422 is still unlikely to match one or more areas of peaks 1423, 1424, and 1425 within an area threshold. As a result, the ejection delay time of 1.37 seconds used for the results of plot 1420 is still not optimal for the sample concentrations being used.

The results for a third experiment in which the ejection delay time is 1.56 seconds are shown in plot 1430. Again, first peak 1431 corresponds to a first well that has a concentration of the sample that is three orders of magnitude greater than the following four wells. Due to the increased ejection delay time, peak 1431 no longer appears to affect peak 1432, which is the peak that immediately follows it. In other words, peak 1432 is no longer convolved with peak 1431. Peaks 1433, 1434, and 1435 follow peak 1432 and are from wells that have a similar concentration to the well that produced peak 1432.

In various embodiments, the area of peak 1432 is then compared to one or more areas of peaks 1433, 1434, and 1435 within an area threshold. The area of peak 1432 now likely matches one or more areas of peaks 1423, 1424, and 1425 within an area threshold. As a result, the ejection delay time of 1.56 seconds used for the results of plot 1420 is optimal for the sample concentrations being used.

Plots 1410-1430 show how the ejection delay time can be adjusted automatically to find an optimal ejection delay time. Again, the optimal delay time selected does not need to be a delay time that was actually used for measurement. Alternatively, it can be a delay time calculated from a curve or function derived from the measured data.

Parameters and Features

As described above, in various embodiments, the operational parameters of an ADE device, an OPI, or an ion source device of an AEMS system are calculated automatically from a series of sample MS experiments. In these experiments, the value of one or more operational parameters of the ADE device, the OPI, or the ion source device is varied. One or more mass peaks are detected for each value of the one or more operational parameters. An optimal value for one or more operational parameters is calculated from this data.

More specifically, an optimal value for the one or more operational parameters is calculated from one or more features of the one or more mass peaks. A feature of one or more mass peaks can include, but is not limited to, a peak height, peak width, a delay time between ejection and mass analysis, or a peak area.

Also, as shown above, one or more other operational parameters may be used in calculating the optimal value of an operational parameter. As a result, there is a complex relationship between operational parameters and mass peak features.

FIG. 15 is an exemplary matrix chart 1500 that shows the one or more mass peak features that can be used to calculate the optimal values of different operational parameters of an ADE device, an OPI, or an ion source device, in accordance with various embodiments. In matrix chart 1500, the columns represent peak features and the rows represent operational parameters of an ADE device, an OPI, or an ion source device. The "X's" show that there is a relationship between a feature and an operation parameter.

System for Calculating an Optimal Parameter Using a Mass Spectrometer

Figure 16:
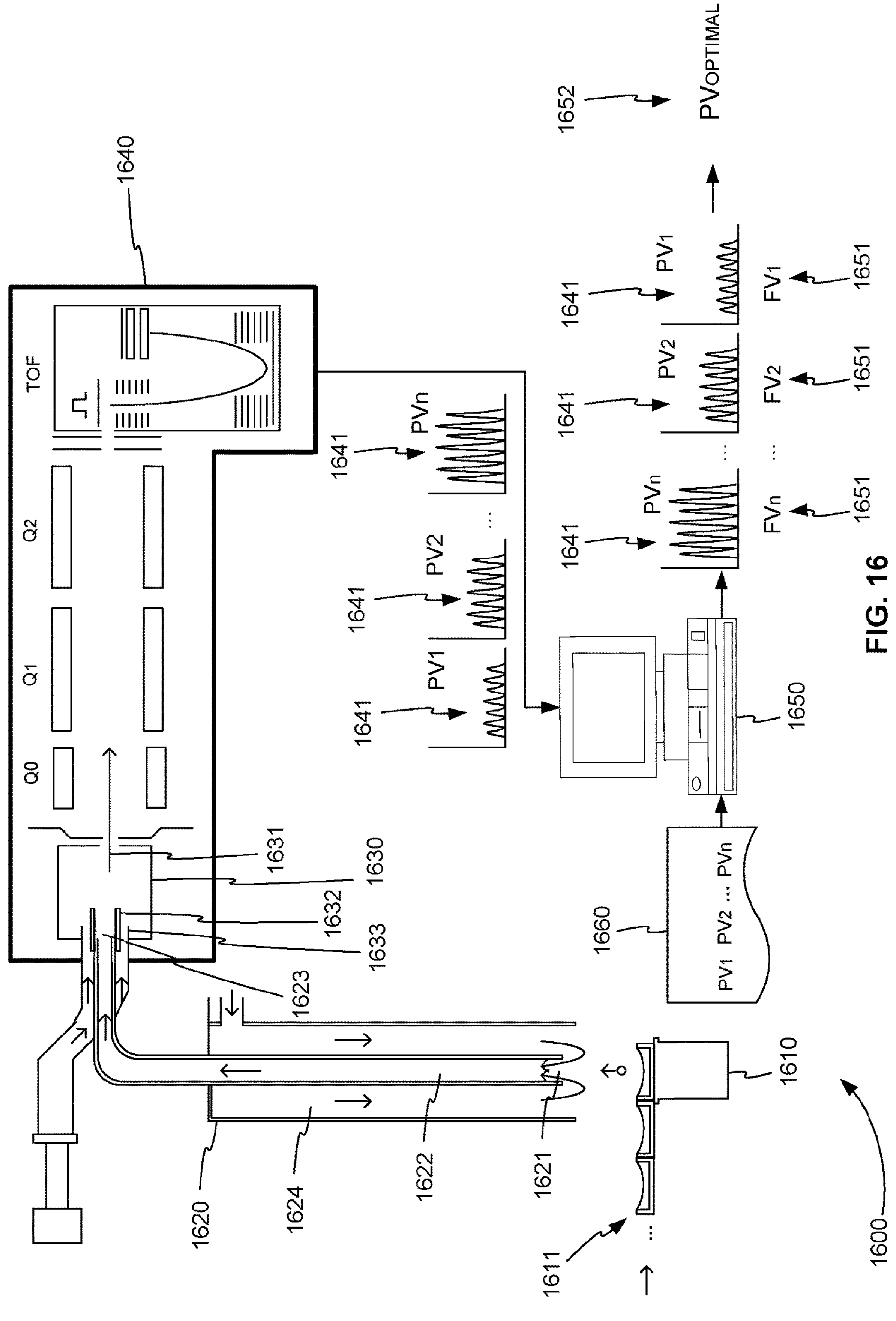
FIG. 16 is a schematic diagram of a system for automatically calculating an optimal value for at least one operational parameter of an ADE device, an OPI, or an ion source device using a mass spectrometer, in accordance with various embodiments.

FIG. 16 is a schematic diagram 1600 of a system for automatically calculating an optimal value for at least one operational parameter of an ADE device, an OPI, or an ion source device using a mass spectrometer, in accordance with various embodiments. The system of FIG. 16 includes ADE device 1610, OPI 1620, ion source device 1630, mass spectrometer 1640, and processor 1650.

ADE device 1610 is adapted to perform one or more ejections of a sample over time. ADE device 1610 can be, for example, ADE device 11 of FIG. 1A.

Returning to FIG. 16, OPI 1620 is adapted to receive the one or more ejections over time at an inlet 1621 of an inner tube 1622, mix received ejections with a solvent to form a series of sample-solvent dilutions, and transfer the series of dilutions to an outlet 1623 of inner tube 1622. OPI 1620 can be, for example, OPI 51 of FIG. 1A.

Returning to FIG. 16, ion source device 1630 is adapted to receive the series of dilutions and ionize the series of dilutions, producing ion beam 1631. Ion source device 1630 can be an electrospray ion source (ESI) device, for example. Ion source device 1630 is shown as part of mass spectrometer 1640 in FIG. 16 but can be a separate device also.

Mass spectrometer 1640 is adapted to receive ion beam 1631 and mass analyze ion beam 1631 over time, producing intensity versus time mass peaks corresponding to the one or more ejections. Mass spectrometer 1640 can perform MS or MS/MS. Mass spectrometer 1640 can be any type of mass spectrometer. Mass spectrometer 1640 is shown as including quadrupole time-of-flight (TOF) mass analyzer, but mass spectrometer 1640 can include any type of mass analyzer such as a triple quadrupole mass analyzer.

Processor 1650 is in communication with ADE device 1610, OPI 1620, ion source device 1630, and mass spectrometer 1640. For each value of a plurality of parameter values 1660 for at least one parameter of ADE device 1610, OPI 1620, or ion source device 1630, processor 1650 performs three steps. Processor 1650 reads plurality of parameter values 1660 from a memory device (not shown), for example. First, processor 1650 sets the at least one parameter to each value. Second, processor 1650 instructs ADE device 1610, OPI 1620, ion source device 1630, and mass spectrometer 1640 to produce one or more intensity versus time mass peaks 1641 for the sample. The sample may be obtained from one of wells 1611 or from two or more wells. Third, processor 1650 calculates a feature value 1651 for at least one feature of one or more intensity versus time mass peaks 1641. A plurality of feature values corresponding to the plurality of parameter values is produced.

Processor 1650 calculates an optimal value 1652 for the at least one parameter from the plurality of feature values corresponding to plurality of parameter values 1660.

In various embodiments, processor 1650 further sets the at least one parameter to optimal value 1652 or processor 1650 further saves optimal value 1652 in a memory device (not shown) for the sample.

In various embodiments, the sample is a standard sample. The standard sample is a standard analyte in a standard solution, for example.

In various embodiments, an optimal parameter is calculated for the alignment of ADE device 1610 and OPI 1620. Specifically, the at least one parameter of ADE device 1610, OPI 1620, or ion source device 1630 includes OPI 1620's x-axis position relative to the position of ADE device 1610 or OPI 1620's y-axis position relative to the position of ADE device 1610. The at least one feature of one or more intensity versus time mass peaks 1641 includes a peak height or intensity. Processer 1650 calculates optimal value 1652 for the at least one parameter by calculating a value for the at least one parameter that produces a maximum for the peak height from the plurality of feature values corresponding to plurality of parameter values 1660.

In various embodiments, an optimal parameter is calculated for the position of inner tube 1622 relative to outer tube 1624 of OPI 1620. Specifically, the at least one parameter of ADE device 1610, OPI 1620, or ion source device 1630 includes a position of inner tube 1622 relative to outer tube 1624 of OPI 1620 at inlet 1621 of inner tube 1622. The at least one feature of one or more intensity versus time mass peaks 1641 includes a peak height or peak width. Processer 1650 calculates optimal value 1652 for the at least one parameter by calculating a value for the at least one parameter that produces a maximum for the peak height or a minimum for the peak width from the plurality of feature values corresponding to plurality of parameter values 1660.

In various embodiments, an optimal parameter is calculated or determined through optimization for the length of protrusion of electrode 1632 of ion source device 1630. Specifically, the at least one parameter of ADE device 1610, OPI 1620, or ion source device 1630 includes a length of protrusion of electrode 1632 of outlet 1623 of inner tube 1622 from nozzle 1633 of ion source device 1630. The at least one feature of one or more intensity versus time mass peaks 1641 includes a peak width or peak height. Processor 1650 further for each value of the at least one parameter instructs OPI 1620 to vary a flow rate of the dilution among a plurality of flow rate values until a width value for the peak width of one or more intensity versus time mass peaks 1641 is less than a peak width threshold. A width value and flow rate value are produced for each value of the at least one parameter. Processor 1650 calculates optimal value 1652 for the at least one parameter by calculating a value for the at least one parameter that produces a peak width with a highest flow rate from the plurality of feature values corresponding to plurality of parameter values 1660.

In various embodiments, an optimal parameter is calculated for a flow rate of OPI 1620. Specifically, the at least one parameter of ADE device 1610, OPI 1620, or ion source device 1630 includes a flow rate of OPI 1620. The at least one feature of one or more intensity versus time mass peaks 1641 includes a peak height, a peak width, or a delay time between sample ejection and sample mass analysis. Processor 1650 calculates optimal value 1652 for the at least one parameter by calculating a value for the at least one parameter that produces a maximum for the peak height, a minimum for the peak width, or a maximum for the delay time from the plurality of feature values corresponding to plurality of parameter values 1660.

In various embodiments, the sample is an experimental sample. The experimental sample is an experimental analyte in an experimental solution, for example.

In various embodiments, an optimal parameter is calculated for an ejection volume of ADE device 1610. Specifically, the at least one parameter of ADE device 1610, OPI 1620, or ion source device 1630 includes a droplet size for ADE device 1610 or a count of drops per sample ejection for ADE device 1610. The at least one feature of one or more intensity versus time mass peaks 1641 includes a peak height or peak area. Processor 1650 calculates optimal value 1652 for the at least one parameter by calculating a value for the at least one parameter that produces a maximum for the peak height or peak area from the plurality of feature values corresponding to plurality of parameter values 1660. In some cases, the CV may need to be considered. For example, for some conditions, even though peaks might be sharper and/or higher but the CV was poor, conditions used to generate such peaks would not be utilized.

In various embodiments, an optimal parameter is calculated for a delay time between sample ejections of ADE device 1610. Specifically, the at least one parameter of ADE device 1610, OPI 1620, or ion source device 1630 includes a delay time between sample ejections for ADE device 1610. The at least one feature of one or more intensity versus time mass peaks 1641 includes a peak area. Processor 1650 calculates the optimal value for the at least one parameter by calculating a minimum value for the delay time between sample ejections that still allows a peak area of a peak of one or more intensity versus time peaks 1641 immediately following a more intense peak to have a similar peak area to a peak of one or more intensity versus time peaks 1641 that does not immediately follow a more intense peak.

In various embodiments, processor 1650 is used to send and receive instructions, control signals, and data to and from ADE device 1610, OPI 1620, ion source device 1630, and mass spectrometer 1640. Processor 1650 controls or provides instructions by, for example, controlling one or more voltage, current, or pressure sources (not shown). Processor 1650 can be a separate device as shown in FIG. 16 or can be a processor or controller of ADE device 1610, OPI 1620, ion source device 1630, or mass spectrometer 1640. Processor 1650 can be, but is not limited to, a controller, a computer, a microprocessor, the computer system of FIG. 2, or any device capable of sending and receiving control signals and data and analyzing data.

Method for Calculating an Optimal Parameter Using a Mass Spectrometer

Figure 17:
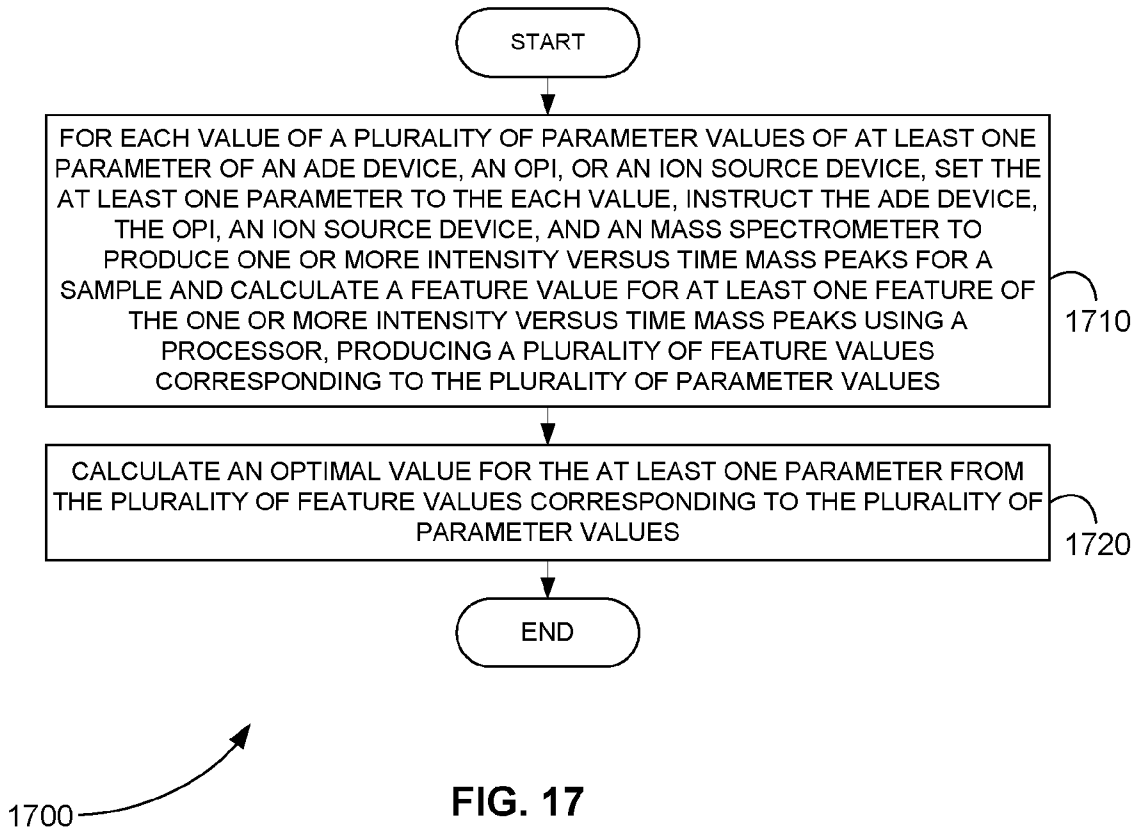
FIG. 17 is a flowchart showing a method for automatically calculating an optimal value for at least one operational parameter of an ADE device, an OPI, or an ion source device using a mass spectrometer, in accordance with various embodiments.

FIG. 17 is a flowchart showing a method 1700 for automatically calculating an optimal value for at least one operational parameter of an ADE device, an OPI, or an ion source device using a mass spectrometer, in accordance with various embodiments.

In step 1710 of method 1700, for each value of a plurality of parameter values for at least one parameter of an ADE device, an OPI, or an ion source device, three steps are performed using a processor. First, the at least one parameter is set to the value. Second, the ADE device, the OPI, the ion source device, and a mass spectrometer are instructed to produce one or more intensity versus time mass peaks for a sample. Third, a feature value is calculated for at least one feature of the one or more intensity versus time mass peaks. A plurality of feature values is produced corresponding to the plurality of parameter values.

In step 1720, an optimal value is calculated for the at least one parameter from the plurality of feature values corresponding to the plurality of parameter values.

The ADE device is adapted to perform one or more ejections of the sample over time. The OPI is adapted to receive the one or more ejections over time at an inlet of an inner tube, mix received ejections with a solvent to form a series of sample-solvent dilutions, and transfer the series of dilutions to an outlet of the inner tube. The ion source device is adapted to receive the series of dilutions and ionize the series of dilutions, producing an ion beam. The mass spectrometer is adapted to receive the ion beam and mass analyze the ion beam over time, producing intensity versus time mass peaks corresponding to the one or more ejections.

Computer Program Product for Calculating an Optimal Parameter Using a Mass Spectrometer In various embodiments, computer program products include a tangible computer-readable storage medium whose contents include a program with instructions being executed on a processor so as to perform a method for automatically calculating an optimal value for at least one operational parameter of an ADE device, an OPI, or an ion source device using a mass spectrometer. This method is performed by a system that includes one or more distinct software modules.

Figure 18:
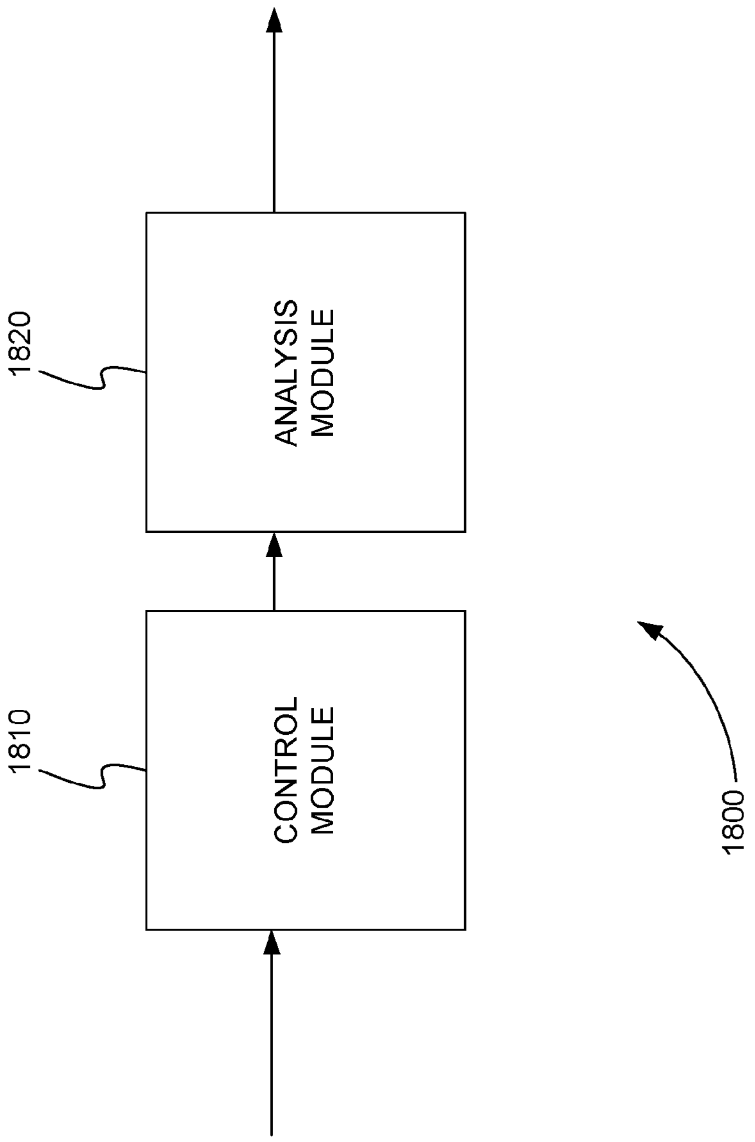
FIG. 18 is a schematic diagram of a system that includes one or more distinct software modules that perform a method for automatically calculating an optimal value for at least one operational parameter of an ADE device, an OPI, or an ion source device using a mass spectrometer, in accordance with various embodiments.

FIG. 18 is a schematic diagram of a system 1800 that includes one or more distinct software modules that perform a method for automatically calculating an optimal value for at least one operational parameter of an ADE device, an OPI, or an ion source device using a mass spectrometer, in accordance with various embodiments. System 1800 includes control module 1810 and analysis module 1820.

For each value of a plurality of parameter values for at least one parameter of an ADE device, an OPI, or an ion source device, control module 1810 sets the at least one parameter to the value. Control module 1810 then instructs the ADE device using the control module, the OPI, the ion source device, and a mass spectrometer to produce one or more intensity versus time mass peaks for a sample. Finally, analysis module 1820 calculates a feature value for at least one feature of the one or more intensity versus time mass peaks, producing a plurality of feature values corresponding to the plurality of parameter values.

Analysis module 1820 calculates an optimal value for the at least one parameter from the plurality of feature values corresponding to the plurality of parameter values.

The ADE device is adapted to perform one or more ejections of the sample over time. The OPI is adapted to receive the one or more ejections over time at an inlet of an inner tube, mix received ejections with a solvent to form a series of sample-solvent dilutions, and transfer the series of dilutions to an outlet of the inner tube. The ion source device is adapted to receive the series of dilutions and ionize the series of dilutions, producing an ion beam. The mass spectrometer is adapted to receive the ion beam and mass analyze the ion beam over time, producing intensity versus time mass peaks corresponding to the one or more ejections.

System for Calculating Electrode Protrusion Length Using an Overflow Sensor

Figure 19:
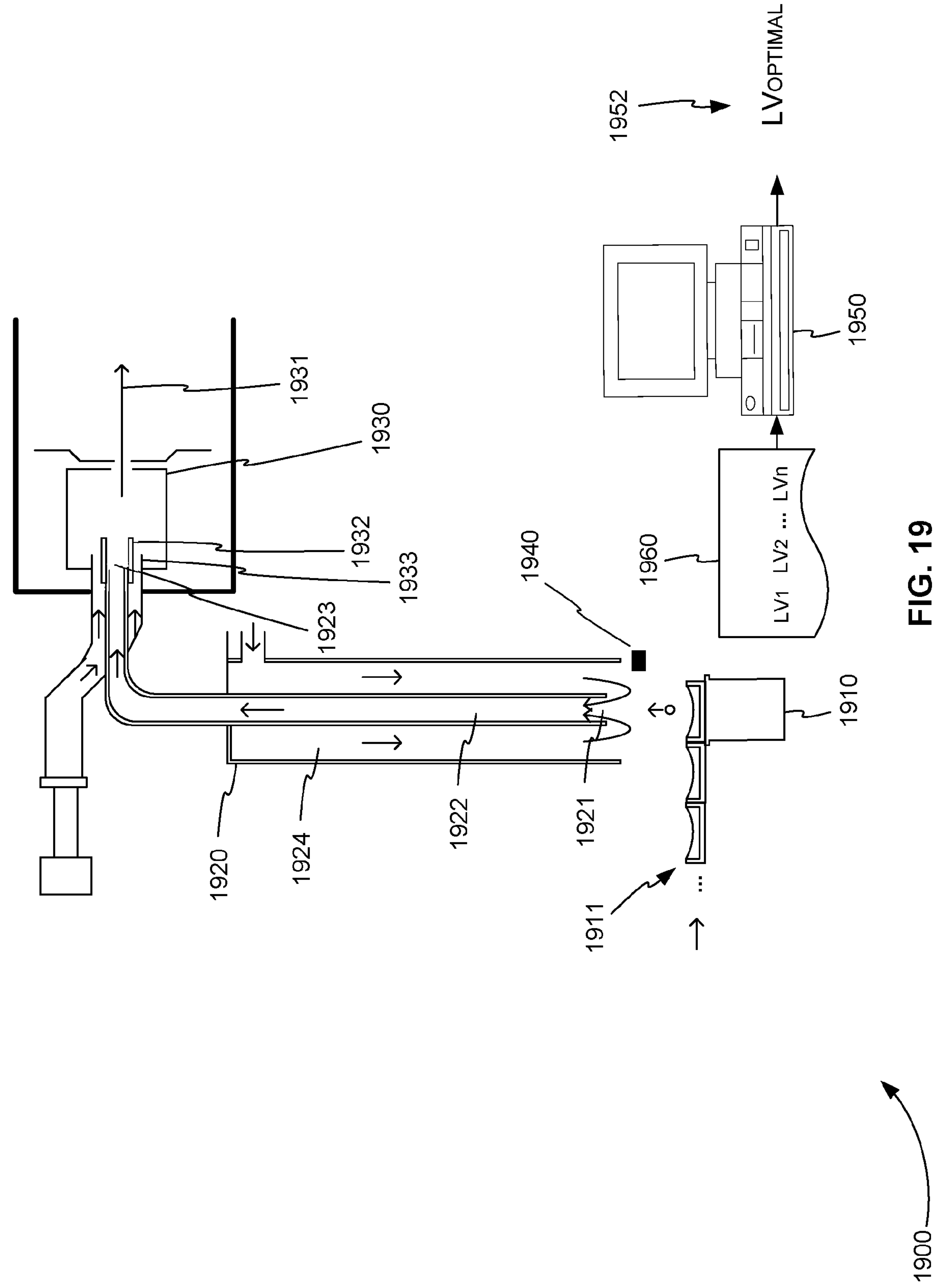
FIG. 19 is a schematic diagram of a system for automatically calculating an optimal length of protrusion of an electrode of an ion source device using an overflow sensor, in accordance with various embodiments.

FIG. 19 is a schematic diagram 1900 of a system for automatically calculating an optimal length of protrusion of an electrode of an ion source device using an overflow sensor, in accordance with various embodiments. The system of FIG. 19 includes ADE device 1910, OPI 1920, ion source device 1930, overflow sensor 1940, and processor 1950.

ADE device 1910 is adapted to perform one or more ejections of a sample over time. ADE device 1910 can be, for example, ADE device 11 of FIG. 1A.

Returning to FIG. 19, OPI 1920 is adapted to receive the one or more ejections over time at an inlet 1921 of an inner tube 1922, mix received ejections with a solvent which can include in inner tube 1922 to form a series of sample-solvent dilutions, and transfer the series of dilutions to an outlet 1923 of inner tube 1922. OPI 1920 can be, for example, OPI 51 of FIG. 1A.

Returning to FIG. 19, ion source device 1930 is adapted to receive the series of dilutions and ionize the series of dilutions, producing ion beam 1931. Ion source device 1930 can be an electrospray ion source (ESI) device, for example.

Overflow sensor 1940 is adapted to measure a flow rate of the series of dilutions and trigger a notification if the flow rate exceeds a threshold.

Processor 1950 is in communication with ADE device 1910, OPI 1920, ion source device 1930, and overflow sensor 1940. For each value of a plurality of length values 1960 for a length of protrusion of electrode 1932 of outlet 1923 of inner tube 1922 of OPI 1920 from nozzle 1933 of ion source device 1930, processor 1950 performs three steps. First, processor 1950 sets the length to each value. Second, processor 1950 instructs ADE device 1910, OPI 1920, and ion source device 1930 to produce ion beam 1931 for the sample at each flow rate value of a plurality of flow rate values until overflow sensor 1940 triggers the notification. A plurality of flow rates is produced for each value. The sample may be obtained from one of wells 1911 or from two or more wells. Third, processor 1950 calculates a highest flow rate value for each value from the plurality of flow rates. A plurality of highest flow rate values is produced corresponding to plurality of length values 1960.

Processor 1950 calculates an optimal value 1952 for the length by calculating a length value that produces a highest overflow flow rate from the plurality of highest flow rate values corresponding to plurality of length values 1950.

In various embodiments, processor 1950 is used to send and receive instructions, control signals, and data to and from ADE device 1910, OPI 1920, ion source device 1930, and mass spectrometer 1940. Processor 1950 controls or provides instructions by, for example, controlling one or more voltage, current, or pressure sources (not shown). Processor 1950 can be a separate device as shown in FIG. 19 or can be a processor or controller of ADE device 1910, OPI 1920, ion source device 1930, or mass spectrometer 1940. Processor 1950 can be, but is not limited to, a controller, a computer, a microprocessor, the computer system of FIG. 2, or any device capable of sending and receiving control signals and data and analyzing data.

Method for Calculating Electrode Protrusion Length Using an Overflow Sensor

Figure 20:
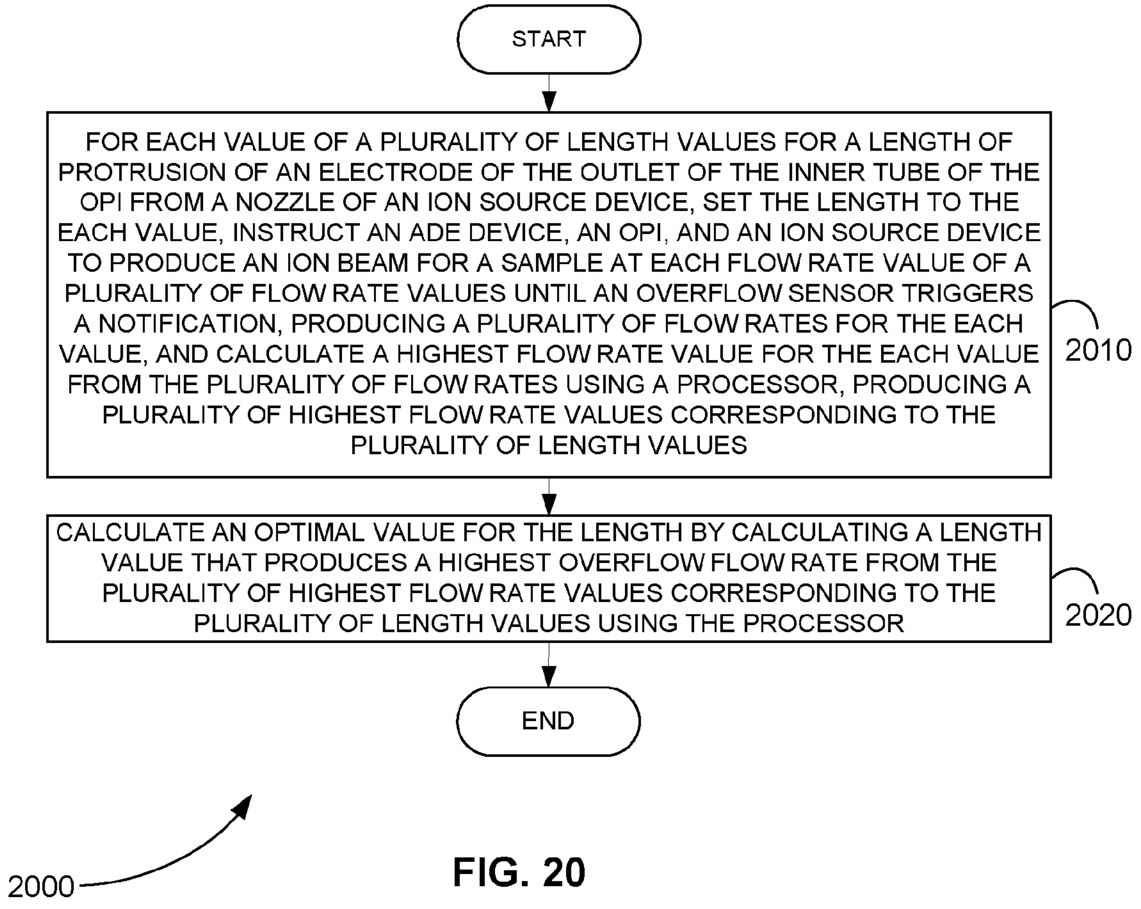
FIG. 20 is a flowchart showing a method for automatically calculating an optimal length of protrusion of an electrode of an ion source device using an overflow sensor, in accordance with various embodiments.

FIG. 20 is a flowchart showing a method 2000 for automatically calculating an optimal length of protrusion of an electrode of an ion source device using an overflow sensor, in accordance with various embodiments.

In step 2010 of method 2000, for each value of a plurality of length values for a length of protrusion of an electrode of the outlet of the inner tube of the OPI from a nozzle of an ion source device three steps are performed using a processor. First, the length is set to each value. Second, the ADE device, the OPI, and the ion source device are instructed to produce an ion beam for a sample at each flow rate value of a plurality of flow rate values until an overflow sensor triggers a notification. A plurality of flow rates for each value. Third, a highest flow rate value is calculated for each value from the plurality of flow rates. A plurality of highest flow rate values is produced corresponding to the plurality of length values.

In step 2020, an optimal value for the length is calculated by calculating a length value that produces a highest overflow flow rate from the plurality of highest flow rate values corresponding to the plurality of length values using the processor.

The ADE device is adapted to perform one or more ejections of the sample over time. The OPI is adapted to receive the one or more ejections over time at an inlet of an inner tube, mix received ejections with a solvent in the inner tube to form a series of sample-solvent dilutions, and transfer the series of dilutions to an outlet of the inner tube. The ion source device is adapted to receive the series of dilutions and ionize the series of dilutions, producing an ion beam. The overflow sensor is adapted to measure a flow rate of the series of dilutions and trigger the notification if the flow rate exceeds a threshold.

Computer Program Product for Calculating Electrode Protrusion Length Using an Overflow Sensor In various embodiments, computer program products include a tangible computer-readable storage medium whose contents include a program with instructions being executed on a processor so as to perform a method for automatically calculating an optimal length of protrusion of an electrode of an ion source device using an overflow sensor. This method is performed by a system that includes one or more distinct software modules.

Returning to FIG. 18, system 1800 can also be used to perform a method for automatically calculating an optimal length of protrusion of an electrode of an ion source device using an overflow sensor, in accordance with various embodiments. System 1800 includes control module 1810 and analysis module 1820.

For each value of a plurality of length values for a length of protrusion of an electrode of the outlet of the inner tube of the OPI from a nozzle of the ion source device, control module 1810 sets the length to each value. Then control module 1810 instructs an ADE device, an OPI, and an ion source device to produce an ion beam for a sample at each flow rate value of a plurality of flow rate values until an overflow sensor triggers a notification, producing a plurality of flow rates for each value. Analysis module 1820 calculates a highest flow rate value for each value from the plurality of flow rates, producing a plurality of highest flow rate values corresponding to the plurality of length values.

Analysis model 1820 calculates an optimal value for the length by calculating a length value that produces a highest overflow flow rate from the plurality of highest flow rate values corresponding to the plurality of length values.

The ADE device is adapted to perform one or more ejections of the sample over time. The OPI is adapted to receive the one or more ejections over time at an inlet of an inner tube, mix received ejections with a solvent in the inner tube to form a series of sample-solvent dilutions, and transfer the series of dilutions to an outlet of the inner tube. The ion source device is adapted to receive the series of dilutions and ionize the series of dilutions, producing an ion beam. The overflow sensor is adapted to measure a flow rate of the series of dilutions and trigger the notification if the flow rate exceeds a threshold.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for automatically calculating an optimal value for at least one operational parameter of an acoustic droplet ejection (ADE) device, an open port interface (OPI), or an ion source device using a mass spectrometer, comprising:

an ADE device adapted to perform one or more ejections of a sample over time;

an OPI adapted to receive the one or more ejections over time at an inlet of an inner tube, mix received ejections with a solvent to form a series of sample-solvent dilutions, and transfer the series of dilutions to an outlet of the inner tube;

an ion source device adapted to receive the series of dilutions and ionize the series of dilutions, producing an ion beam;

a mass spectrometer adapted to receive the ion beam and mass analyze the ion beam over time, producing intensity versus time mass peaks corresponding to the one or more ejections; and a processor in communication with the ADE device, the OPI, the ion source device, and the mass spectrometer that for each value of a plurality of parameter values for at least one parameter of the ADE device, the OPI, or the ion source device, sets the at least one parameter to the each value, instructs the ADE device, the OPI, the ion source device, and the mass spectrometer to produce one or more intensity versus time mass peaks for the sample, and calculates a feature value for at least one feature of the one or more intensity versus time mass peaks, producing a plurality of feature values corresponding to the plurality of parameter values, and calculates an optimal value for the at least one parameter from the plurality of feature values corresponding to the plurality of parameter values.

2. The system of claim 1, wherein the processor further sets the at least one parameter to the optimal value or wherein the processor further saves the optimal value in a memory device for the sample.

3. The system of claim 1, wherein the sample comprises a standard analyte in a standard solution.

4. The system of claim 3, wherein the at least one parameter of the ADE device, the OPI, or the ion source device comprises an OPI x-axis position relative to a position of the ADE device or an OPI y-axis position relative to the position of the ADE device, wherein the at least one feature of the one or more intensity versus time mass peaks comprises a peak height, and wherein the processor calculates the optimal value for the at least one parameter by calculating a value for the at least one parameter that produces a maximum for the peak height from the plurality of feature values corresponding to the plurality of parameter values.

5. The system of claim 3, wherein the at least one parameter of the ADE device, the OPI, or the ion source device comprises a position of the inner tube relative to an outer tube of the OPI at the inlet of the inner tube, wherein the at least one feature of the one or more intensity versus time mass peaks comprises a peak height or a peak width, and wherein the processor calculates the optimal value for the at least one parameter by calculating a value for the at least one parameter that produces a maximum for the peak height or a minimum for the peak width from the plurality of feature values corresponding to the plurality of parameter values.

6. The system of claim 3, wherein the at least one parameter of the ADE device, the OPI, or the ion source device comprises a length of protrusion of an electrode of the outlet of the inner tube from a nozzle of the ion source device, wherein the at least one feature of the one or more intensity versus time mass peaks comprises a peak width, wherein the processor further for, the each value of the at least one parameter, instructs the OPI to vary a flow rate of the dilution among a plurality of flow rate values until a width value for the peak width of the one or more intensity versus time mass peaks is less than a peak width threshold, producing a width value and flow rate value for the each value, and wherein the processor calculates the optimal value for the at least one parameter by calculating a value for the at least one parameter that produces a peak width with a highest flow rate from the plurality of feature values corresponding to the plurality of parameter values.

7. The system of claim 3, wherein the at least one parameter of the ADE device, the OPI, or the ion source device comprises a flow rate of the OPI, wherein the at least one feature of the one or more intensity versus time mass peaks comprises a peak height, a peak width, or a delay time between sample ejection and sample mass analysis, and wherein the processor calculates the optimal value for the at least one parameter by calculating a value for the at least one parameter that produces a maximum for the peak height, a minimum for the peak width, or a maximum for the delay time from the plurality of feature values corresponding to the plurality of parameter values.

8. The system of claim 1, wherein the sample comprises an experimental analyte in an experimental solution.

9. The system of claim 8, wherein the at least one parameter of the ADE device, the OPI, or the ion source device comprises a droplet size for the ADE device or a count of drops per sample ejection for the ADE device, wherein the at least one feature of the one or more intensity versus time mass peaks comprises a peak height, and wherein the processor calculates the optimal value for the at least one parameter by calculating a value for the at least one parameter that produces a maximum for the peak height from the plurality of feature values corresponding to the plurality of parameter values.

10. The system of claim 8, wherein the at least one parameter of the ADE device, the OPI, or the ion source device comprises a delay time between sample ejections for the ADE device, wherein the at least one feature of the one or more intensity versus time mass peaks comprises a peak area, and wherein the processor calculates the optimal value for the at least one parameter by calculating a minimum value for the delay time between sample ejections that still allows a peak area of a peak of the one or more intensity versus time peaks immediately following a more intense peak to have a similar peak area to a peak of the one or more intensity versus time peaks that does not immediately follow a more intense peak.

11. A method for automatically calculating an optimal value for at least one operational parameter of an acoustic droplet ejection (ADE) device, an open port interface (OPI), or an ion source device using a mass spectrometer, comprising:

for each value of a plurality of parameter values for at least one parameter of an ADE device, an OPI, or an ion source device, setting the at least one parameter to the each value, instructing the ADE device, the OPI, the ion source device, and a mass spectrometer to produce one or more intensity versus time mass peaks for a sample, and calculating a feature value for at least one feature of the one or more intensity versus time mass peaks using a processor, producing a plurality of feature values corresponding to the plurality of parameter values, and calculating an optimal value for the at least one parameter from the plurality of feature values corresponding to the plurality of parameter values, wherein the ADE device is adapted to perform one or more ejections of the sample over time, wherein the OPI is adapted to receive the one or more ejections over time at an inlet of an inner tube, mix received ejections with a solvent in the inner tube to form a series of sample-solvent dilutions, and transfer the series of dilutions to an outlet of the inner tube, wherein the ion source device is adapted to receive the series of dilutions and ionize the series of dilutions, producing an ion beam, and wherein the mass spectrometer is adapted to receive the ion beam and mass analyze the ion beam over time, producing intensity versus time mass peaks corresponding to the one or more ejections.

12. A computer program product, comprising a non-transitory and tangible computer-readable storage medium whose contents include a program with instructions being executed on a processor so as to perform a method for automatically calculating an optimal value for at least one operational parameter of an acoustic droplet ejection (ADE) device, an open port interface (OPI), or an ion source device using a mass spectrometer, the method comprising:

providing a system, wherein the system comprises one or more distinct software modules, and wherein the one or more distinct software modules comprise a control module and an analysis module;

for each value of a plurality of parameter values for at least one parameter of an ADE device, an OPI, or an ion source device, setting the at least one parameter to the each value, instructing the ADE device using the control module, the OPI, the ion source device, and a mass spectrometer to produce one or more intensity versus time mass peaks for a sample using the control module, and calculating a feature value for at least one feature of the one or more intensity versus time mass peaks using the analysis module, producing a plurality of feature values corresponding to the plurality of parameter values, and calculating an optimal value for the at least one parameter from the plurality of feature values corresponding to the plurality of parameter values using the analysis module, wherein the ADE device is adapted to perform one or more ejections of the sample over time, wherein the OPI is adapted to receive the one or more ejections over time at an inlet of an inner tube, mix received ejections with a solvent in the inner tube to form a series of sample-solvent dilutions, and transfer the series of dilutions to an outlet of the inner tube, wherein the ion source device is adapted to receive the series of dilutions and ionize the series of dilutions, producing an ion beam, and wherein the mass spectrometer is adapted to receive the ion beam and mass analyze the ion beam over time, producing intensity versus time mass peaks corresponding to the one or more ejections.

* * * * *